US010857842B2

(12) United States Patent
Kodama et al.

(10) Patent No.: US 10,857,842 B2
(45) Date of Patent: Dec. 8, 2020

(54) PNEUMATIC TIRE

(71) Applicant: The Yokohama Rubber Co., LTD., Tokyo (JP)

(72) Inventors: Yuji Kodama, Hiratsuka (JP); Yuji Minami, Hiratsuka (JP)

(73) Assignee: The Yokohama Rubber Co., LTD.

( * ) Notice: Subject to any disclaimer, the term of this patent is extended or adjusted under 35 U.S.C. 154(b) by 426 days.

(21) Appl. No.: 15/569,738

(22) PCT Filed: May 9, 2016

(86) PCT No.: PCT/JP2016/063774
§ 371 (c)(1),
(2) Date: Oct. 26, 2017

(87) PCT Pub. No.: WO2016/181940
PCT Pub. Date: Nov. 17, 2016

(65) Prior Publication Data
US 2018/0126798 A1 May 10, 2018

(30) Foreign Application Priority Data

May 14, 2015 (JP) .................................. 2015-099076

(51) Int. Cl.
*B60C 13/02* (2006.01)
*B60C 3/04* (2006.01)

(52) U.S. Cl.
CPC ................ *B60C 13/02* (2013.01); *B60C 3/04* (2013.01)

(58) Field of Classification Search
CPC ..... B60C 13/00; B60C 13/001; B60C 13/002; B60C 13/003; B60C 13/02; B60C 13/023
See application file for complete search history.

(56) References Cited

U.S. PATENT DOCUMENTS

2009/0032161 A1 2/2009 Yamaguchi
2013/0014877 A1 1/2013 Ahn et al.
(Continued)

FOREIGN PATENT DOCUMENTS

DE 1756749 * 11/1957
JP 8-258518 * 10/1996
(Continued)

OTHER PUBLICATIONS

International Search Report for International Application No. PCT/JP2016/063774 dated Aug. 9, 2016, 4 pages, Japan.

Primary Examiner — Justin R Fischer
(74) Attorney, Agent, or Firm — Thorpe North & Western

(57) ABSTRACT

A pneumatic tire of the present technology includes: protrusions that are provided in a range including a maximum tire width position in a tire side portion, and extend in a direction that intersects a tire radial direction. The protrusions are provided having a space therebetween in a tire circumferential direction, pass through a center of rotation, extend in the tire radial direction and, when a first straight line and a second straight line each having different positions in the tire circumferential direction each traverse the protrusions, have a ratio of from 0.8 to 1.2, both inclusive, between a total mass per unit length for the protrusions traversed by the first straight line and a total mass per unit length for the protrusions traversed by the second straight line. A ratio between a total width SW and an outer diameter OD fulfills the relationship SW/OD≤0.3.

16 Claims, 24 Drawing Sheets

(56) References Cited

U.S. PATENT DOCUMENTS

| 2013/0042953 A1 | 2/2013 | Kuwayama | |
| 2015/0165831 A1* | 6/2015 | Kodama | B60C 11/01 |
| | | | 152/523 |
| 2015/0266347 A1* | 9/2015 | Kodama | B60C 13/02 |
| | | | 152/523 |

FOREIGN PATENT DOCUMENTS

| JP | 2001-39129 | * | 2/2001 |
| JP | 2001-039129 | | 2/2001 |
| JP | 2011-246122 | | 12/2011 |
| JP | 2013-018474 | | 1/2013 |
| JP | 2014-80099 | * | 5/2014 |
| JP | 2015-051768 | | 3/2015 |
| WO | WO 80/00236 | * | 2/1980 |
| WO | WO 2007/032405 | | 3/2007 |
| WO | WO 2011/135774 | | 11/2011 |
| WO | WO 2014/024587 | * | 2/2014 |

* cited by examiner

PNEUMATIC TIRE

TECHNICAL FIELD

The present technology relates to a pneumatic tire.

BACKGROUND ART

Conventionally, in Japanese Unexamined Patent Application Publication No. 2013-18474, there is disclosed a tire for a vehicle that includes a sidewall on which curved projections are formed. In Japanese Unexamined Patent Application Publication No. 2013-18474, a flow of air that enters the sidewall moves naturally to an inner side of a wheel housing of the vehicle without passing through the sidewall, producing a downforce that presses the upper ends of the treads of the tire downward. Note that when the downforce occurs, lift that serves as a force by which the vehicle is lifted upward is reduced.

Furthermore, conventionally, in International Patent Application Publication No. WO 2011/135774, there is disclosed a technique for narrowing a total width of the pneumatic tire and decreasing a front projected area (the projected area when viewed from a rolling direction of the pneumatic tire) to reduce an air resistance around the tire.

Nevertheless, in the pneumatic tire according to Japanese Unexamined Patent Application Publication No. 2013-18474, homogeneity in a tire circumferential direction may decrease as a result of the projections, protrusions, and circumferential convex portions, making it impossible to maintain good uniformity.

SUMMARY

The present technology provides a pneumatic tire capable of increasing downforce and reducing air resistance while maintaining good uniformity.

A pneumatic tire according to the present technology includes a plurality of protrusions that are provided in a range including a maximum tire width position in a tire side portion, and extend in a direction that intersects a tire radial direction. The plurality of protrusions are provided having a space therebetween in a tire circumferential direction, pass through a center of rotation, extend in the tire radial direction and, when a first straight line and a second straight line each having different positions in the tire circumferential direction each traverse the protrusions, have a ratio of from 0.8 to 1.2, both inclusive, between a total mass per unit length for the protrusions traversed by the first straight line and a total mass per unit length for the protrusions traversed by the second straight line. A ratio between a total width SW and an outer diameter OD fulfills the relationship SW/OD≤0.3.

Further, a pneumatic tire according to the present technology includes a plurality of protrusions that are provided in a range including a maximum tire width position in a tire side portion, and extend in a direction that intersects a radial direction. The plurality of protrusions are provided having a space therebetween in a tire circumferential direction, pass through a center of rotation, extend in the tire radial direction and, when a first straight line and a second straight line each having different positions in the tire circumferential direction each traverse the protrusions, have a ratio of from 0.8 to 1.2, both inclusive, between a total cross-sectional area along the first straight line for the protrusions traversed by the first straight line and a total cross-sectional area along the second straight line for the protrusions traversed by the second straight line. A ratio between a total width SW and an outer diameter OD fulfills the relationship SW/OD≤0.3.

According to the pneumatic tire of the present technology, the first straight line traverses two or more of the protrusions, and the second straight line traverses one of the protrusions.

According to the pneumatic tire of the present technology, an amount of fluctuation in the tire circumferential direction of a mass of the protrusions per 1 degree in the tire circumferential direction is 0.2 g/degree or less.

According to the pneumatic tire of the present technology, the protrusions have a height at a central portion that is greater than a height at both end portions.

According to the pneumatic tire of the present technology, the protrusions have a width at the central portion that is greater than a width at both end portions.

According to the pneumatic tire of the present technology, the protrusions pass through the maximum tire width position.

According to the pneumatic tire of the present technology, at least one of the plurality of protrusions includes a groove.

According to the pneumatic tire of the present technology, a depth of the groove is from 5% to 80%, both inclusive, of a height of a section where the groove of the protrusion is provided.

According to the pneumatic tire of the present technology, at least one of the plurality of protrusions includes a recessed portion.

According to the pneumatic tire of the present technology, the spaces between each of the protrusions in the tire circumferential direction are not uniform.

According to the pneumatic tire of the present technology, a vehicle inner/outer orientation when mounted on a vehicle is designated, and the protrusions are formed at least on the tire side portion on a vehicle outer side.

The pneumatic tire according to the present technology is capable of increasing downforce and reducing air resistance while maintaining good uniformity.

DETAILED DESCRIPTION

Embodiments of the present technology are described in detail below with reference to the drawings. However, the present technology is not limited by the embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
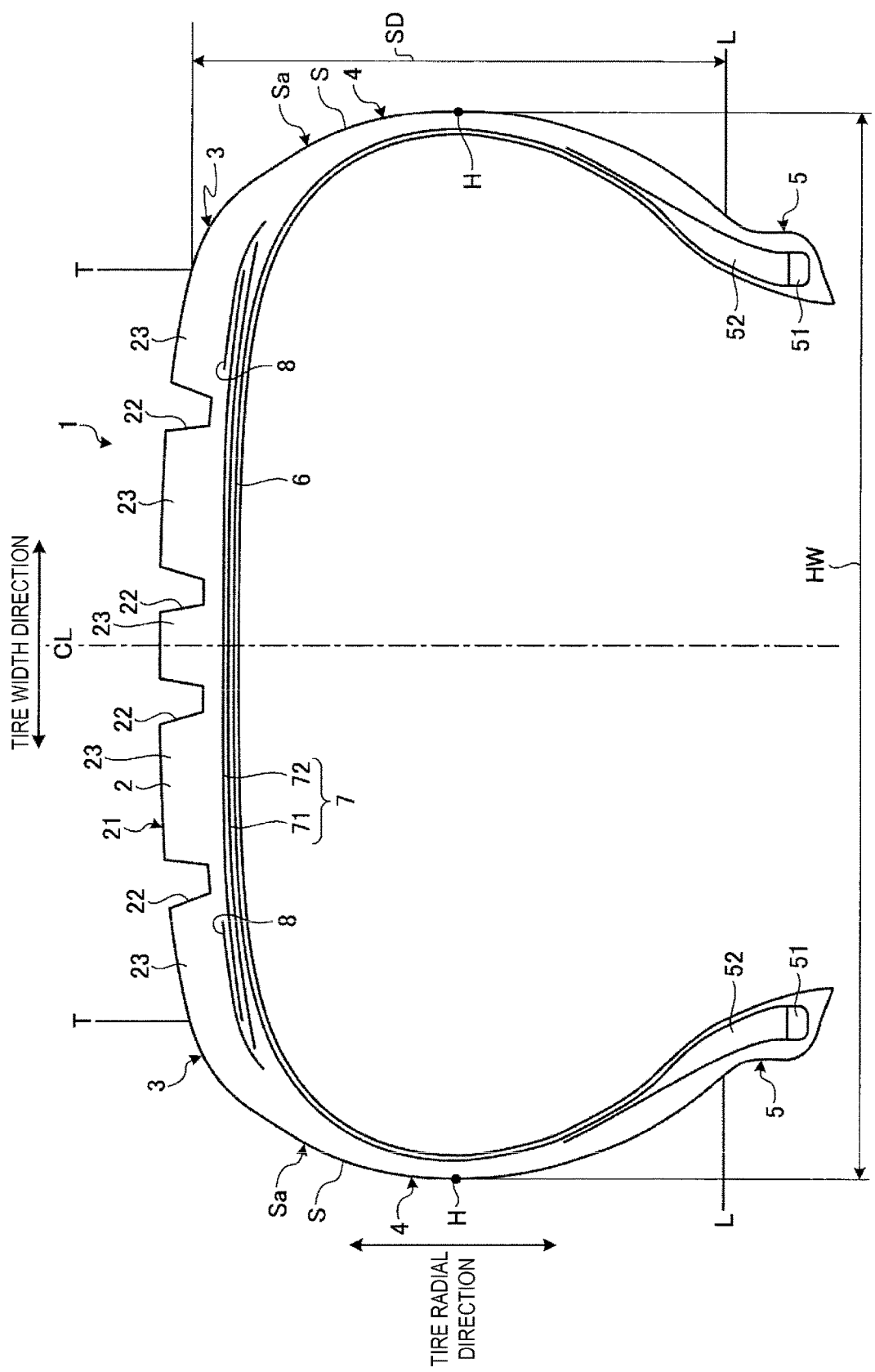
FIG. 1 is a meridian cross-sectional view of a pneumatic tire according to an embodiment of the present technology.
Figure 2:
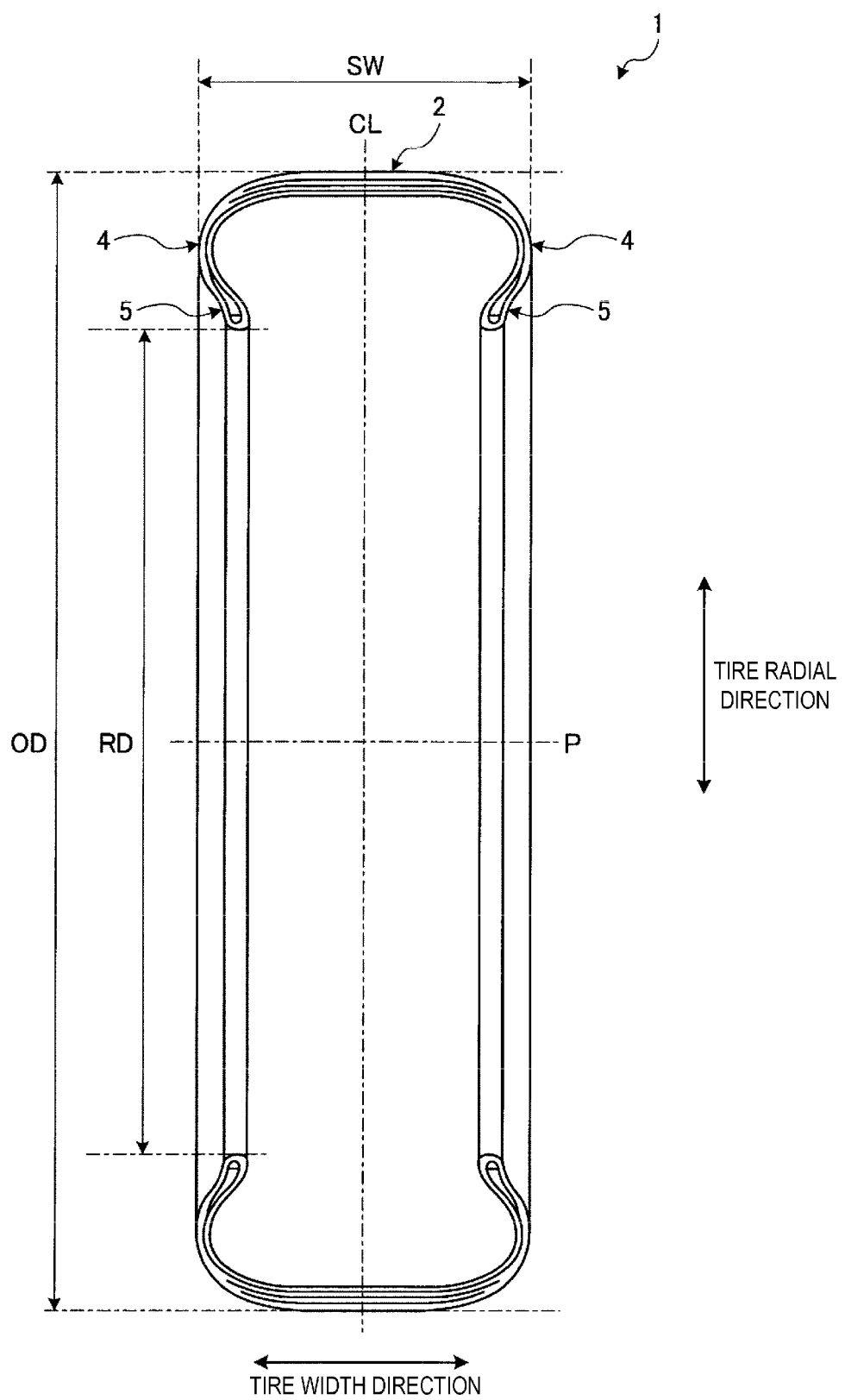
FIG. 2 is a meridian cross-sectional overall view of the pneumatic tire according to the embodiment of the present technology.

FIG. 1 is a meridian cross-sectional view of a pneumatic tire 1 according to the present embodiment. FIG. 2 is a meridian cross-sectional overall view of the pneumatic tire 1 according to the present embodiment.

In the following description, "tire radial direction" refers to a direction orthogonal to a rotation axis P (refer to FIG. 2; hereinafter also referred to as a center of rotation) of the pneumatic tire 1; "inner side in the tire radial direction" refers to a side facing the rotation axis P in the tire radial direction; and "outer side in the tire radial direction" refers to a side distanced from the rotation axis P in the tire radial direction. Likewise, "tire circumferential direction" refers to the circumferential direction taking the rotation axis P as a center axis. Additionally, "tire width direction" refers to the direction parallel with the rotation axis P. "Inward in the tire width direction" refers to the direction toward a tire equatorial plane CL (tire equator line) in the tire width direction. "Outward in the tire width direction" refers to the direction away from the tire equatorial plane CL in the tire width direction. "Tire equatorial plane CL" refers to a plane that is orthogonal to the rotation axis (also referred to as the center of tire rotation) P of the pneumatic tire 1 and that passes through a center in the tire width direction of the pneumatic tire 1. The tire width is a width in the tire width direction between constituents located to the outside in the tire width direction, or in other words, the distance between the constituents that are most distant in the tire width direction from the tire equatorial plane CL. "Tire equator line" refers to the line along the tire circumferential direction of the pneumatic tire 1 that lies on the tire equatorial plane CL. In the present embodiment, the tire equator line and the tire equatorial plane are both denoted by reference sign CL.

As illustrated in FIG. 1, the pneumatic tire 1 of this embodiment is mainly used in a passenger vehicle, and mainly includes a tread portion 2, shoulder portions 3 on both sides of the tread portion 2, and a sidewall portion 4 and a bead portion 5 continuing sequentially from each of the shoulder portions 3. Additionally, the pneumatic tire 1 includes a carcass layer 6, a belt layer 7, and a belt reinforcing layer 8.

The tread portion 2 is formed from a rubber material (tread rubber), is exposed on the outermost side in the tire radial direction of the pneumatic tire 1, and the surface thereof constitutes the outline profile of the pneumatic tire 1. A tread surface 21 is formed on an outer peripheral surface of the tread portion 2, in other words, on a road contact surface that comes in contact with a road surface when traveling. The tread surface 21 is provided with a plurality (four in the present embodiment) of main grooves 22 that extend in the tire circumferential direction. The main grooves 22 are straight main grooves parallel with the tire equator line CL. Moreover, a plurality of rib-like land portions 23 extending in the tire circumferential direction and parallel with the tire equator line CL are formed in the tread surface 21 by the plurality of main grooves 22. Additionally, while not explicitly illustrated, lug grooves that intersect with the main grooves 22 in each of the land portions 23 are provided in the tread surface 21. The land portions 23 are divided into a plurality of segments in the tire circumferential direction by the lug grooves. Furthermore, the lug grooves are formed so as to open to an outermost side in the tire width direction of the tread portion 2, that is, the outer side in the tire width direction. Note that the lug grooves may have a form that communicates with the main grooves 22 or may have a form that does not communicate with the main grooves 22.

The shoulder portions 3 are regions of the tread portion 2 located outward in the tire width direction. Additionally, the sidewall portion 4 is exposed on the outermost side of the pneumatic tire 1 in the tire width direction. The bead portion 5 includes a bead core 51 and a bead filler 52. The bead core 51 is formed by a bead wire, which is a steel wire, wound into an annular shape. The bead filler 52 is a rubber material that is disposed in space formed by an end portion of the carcass layer 6 in the tire width direction folded back at the position of the bead core 51.

The end portions of the carcass layer 6 in the tire width direction are folded over the pair of bead cores 51 from inward to outward in the tire width direction, and the carcass layer 6 is stretched in a toroidal shape in the tire circumferential direction to form the framework of the tire. The carcass layer 6 is constituted by a plurality of coating-rubber-covered carcass cords (not illustrated) disposed in alignment at an angle with respect to the tire circumferential direction that conforms with the tire meridian direction. The carcass cords are made of organic fibers (e.g., polyester, rayon, nylon, or the like). At least one carcass layer 6 is provided.

The belt layer 7 has a multi-layer structure where at least two layers (belts 71 and 72) are stacked; is disposed on an outer side in the tire radial direction that is the periphery of the carcass layer 6, in the tread portion 2; and covers the carcass layer 6 in the tire circumferential direction. The belts 71 and 72 each include a plurality of coating-rubber-covered cords (not illustrated) disposed in alignment at a predetermined angle with respect to the tire circumferential direction (for example, from 20 degrees to 30 degrees). The cords are made of steel or organic fibers (polyester, rayon, nylon, or the like). Additionally, the belts 71 and 72 overlap each other and are disposed so that the direction of the cords of the respective belts intersect each other.

The belt reinforcing layer 8 is disposed outward of the belt layer 7 in the tire radial direction on the outer periphery thereof and covers the belt layer 7 in the tire circumferential direction. The belt reinforcing layer 8 includes a plurality of coating-rubber-covered cords (not illustrated) disposed in alignment in the tire width direction substantially parallel (±5 degrees) with the tire circumferential direction. The cords are made of steel or organic fibers (polyester, rayon, nylon, or the like). The belt reinforcing layer 8 illustrated in FIG. 1 is disposed so as to cover end portions of the belt layer 7 in the tire width direction. The configuration of the belt reinforcing layer 8 is not limited to that described above. Although not explicitly illustrated, a configuration may be used where the belt reinforcing layer 8 is disposed so as to cover the entirety of the belt layer 7. Alternatively, for example, a configuration having two reinforcing layers may be used, where the belt reinforcing layer 8 is formed so that the reinforcing layer on the inner side in the tire radial direction is longer in the tire width direction than the belt layer 7 and is disposed so as to cover the entirety of the belt layer 7, and the reinforcing layer on the outer side in the tire radial direction is disposed so as only to cover the end portions of the belt layer 7 in the tire width direction. Alternatively, for example, a configuration having two reinforcing layers may be used, where each of the reinforcing layers is disposed so as only to cover the end portions of the belt layer 7 in the tire width direction. In other words, the belt reinforcing layer 8 overlaps at least the end portion of the belt layer 7 in the tire width direction. Additionally, the belt reinforcing layer 8 is constituted of a band-like strip material (having, for example, a width of 10 mm) wound in the tire circumferential direction.

Herein, a total width SW is the space between the sidewall portions 4 that include a design (a pattern, alphanumerics, or the like of the tire side surface) on the sidewall portion 4 in an unloaded state in which the pneumatic tire 1 is mounted on a regular rim and inflated to a regular internal pressure (230 kPa for example). An outer diameter OD is the outer diameter of the tire at this time, and an inner diameter RD is the inner diameter of the tire at this time. Note that the internal pressure of 230 kPa as described above is selected for specifying the dimensions of the pneumatic tire such as the total width SW. All of the parameters of the tire dimensions stated in this Specification are specified under an internal pressure of 230 kPa and in the unloaded state. Nevertheless, it should be understood that inflating to an internal pressure of 230 kPa is not necessary for the application of the present technology, and the pneumatic tire 1 according to the present technology inflated to an internal pressure in the typically used range exhibits the effects of the present technology.

Further, the "tire side portion S" refers to, in FIG. 1, the outer side in the tire width direction from a ground contact edge T of the tread portion 2 or, in other words, a surface that uniformly continues in a range of the outer side in the tire radial direction from a rim check line L. Additionally, "ground contact edge T" refers to both outermost edges in the tire width direction of a region in which the tread surface 21 of the tread portion 2 of the pneumatic tire 1 contacts the road surface with the pneumatic tire 1 mounted on a regular rim, inflated to the regular internal pressure, and loaded with 70% of the regular load. The ground contact edge T is continuous in the tire circumferential direction. Moreover, "rim check line L" refers to a line used to confirm whether the tire has been mounted on the rim correctly and, typically, is an annular convex line closer to the outer side in the tire radial direction than a rim flange and continues in the tire circumferential direction along a portion adjacent to the rim flange on a front side surface of the bead sections 5.

"Maximum tire width position H," as illustrated in FIG. 1, is the position of the edges of a tire cross-sectional width HW where the width in the tire width direction is greatest. "Tire cross-sectional width HW" is the maximum total tire width SW in the tire width direction excluding any design (patterns or characters or the like on the tire side surface), when the pneumatic tire 1 is mounted on a regular rim, inflated to the regular internal pressure, and in an unloaded state. In tires provided with a rim protection bar (provided along the tire circumferential direction and projecting outward in the tire width direction) that protects the rim, the rim protection bar is the most outward portion in the tire width direction, but the cross-sectional width HW as defined in this embodiment excludes the rim protection bar.

Here, "regular rim" refers to a "standard rim" defined by the Japan Automobile Tyre Manufacturers Association Inc. (JATMA), "Design Rim" defined by the Tire and Rim Association, Inc. (TRA), or "Measuring Rim" defined by the European Tyre and Rim Technical Organisation (ETRTO). "Regular internal pressure" refers to "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO.

The pneumatic tire 1 of the present embodiment has, as illustrated in FIG. 2, a ratio between the total width SW and the outer diameter OD that satisfies the relationship SW/OD≤0.3. Further, the pneumatic tire 1 of the present embodiment, has a ratio between the inner diameter RD and the outer diameter OD that satisfies the relationship RD/OD≥0.7.

The rim used in the present embodiment has a rim diameter compatible with the inner diameter RD of the pneumatic tire 1, and has a nominal rim width corresponding to the specified rim width Rm (mm) shown in Table 2 that is the closest value (Rm=K1×Sn) obtained from the product of the nominal size Sn of the tire section width HW and the coefficient K1 determined according to the aspect ratio, described in the correspondence table (Table 1), of the tire mounted on the rim, in accordance with ISO 4000-1:2001.

TABLE 1

| Aspect ratio | K1 |
| --- | --- |
| 20-25 | 0.92 |
| 30-40 | 0.90 |
| 45 | 0.85 |
| 50-55 | 0.80 |
| 60-70 | 0.75 |
| 75-95 | 0.70 |

TABLE 2

| Nominal rim width | Rm(mm) |
| --- | --- |
| 3 | 76.2 |
| 3.5 | 88.9 |
| 4 | 101.6 |
| 4.5 | 114.3 |
| 5 | 127 |
| 5.5 | 139.7 |
| 6 | 152.4 |
| 6.5 | 165.1 |
| 7 | 177.8 |
| 7.5 | 190.5 |
| 8 | 203.2 |
| 8.5 | 215.9 |
| 9 | 228.6 |
| 9.5 | 241.3 |
| 10 | 254 |

Protrusion

The pneumatic tire 1 of the present embodiment includes protrusions 9 provided so as to project to the outer side of the tire from a tire side surface Sa, which is the profile of the surface of the tire side portion S, in a range SD of the tire side portion S, including the maximum tire width position H.

Figure 3A:
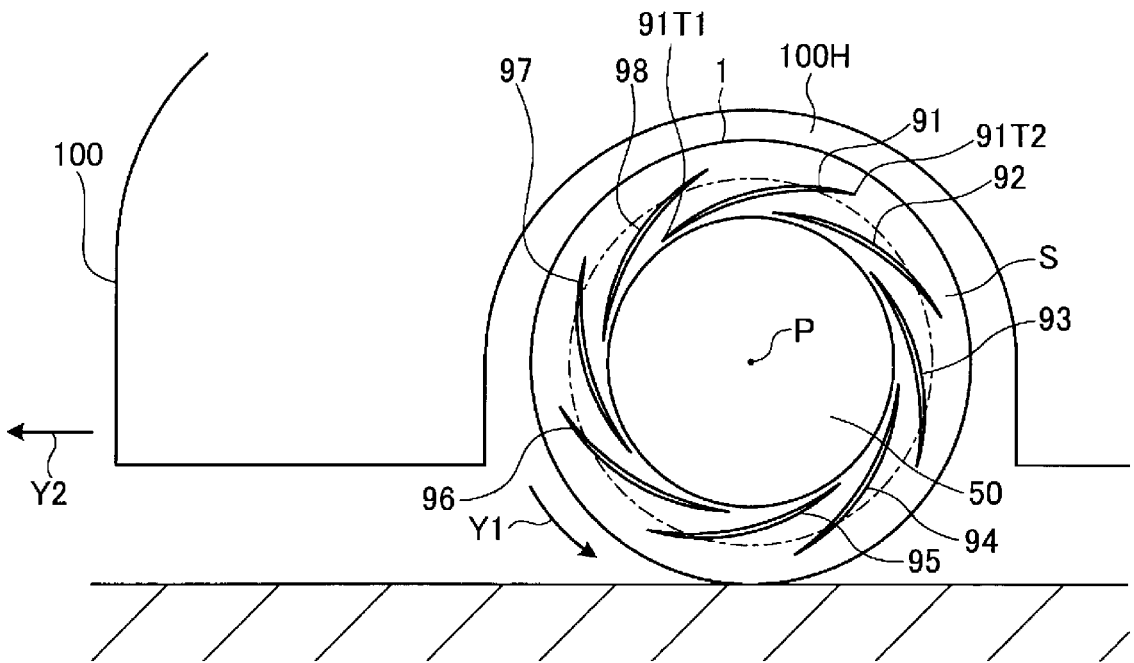
FIG. 3A is a diagram illustrating an example of the pneumatic tire provided with protrusions.
Figure 3B:
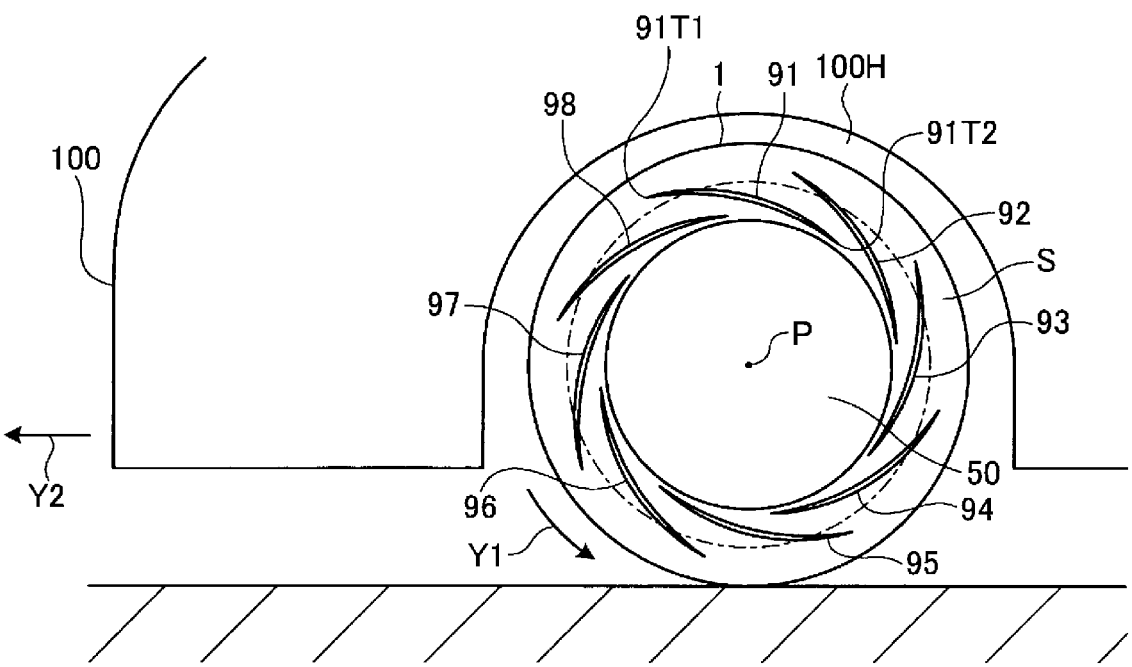
FIG. 3B is a diagram illustrating an example of the pneumatic tire provided with protrusions.

FIG. 3A and FIG. 3B are diagrams illustrating an example of the pneumatic tire 1 provided with the protrusions 9 in the range SD of FIG. 1. FIG. 3A illustrates an example in which the pneumatic tire 1 is mounted on a vehicle 100. As illustrated in FIG. 3A, the pneumatic tire 1 is mounted in an interior of a tire housing 100H of the vehicle 100. When the rotation direction of the pneumatic tire 1 is the direction of the arrow Y1, an advancement direction of the vehicle 100 is the direction of the arrow Y2.

The pneumatic tire 1 includes a plurality of protrusions 91, 92, 93, 94, 95, 96, 97, and 98 on the tire side portion S. In this example, the spaces between each of the plurality of protrusions 91, 92, 93, 94, 95, 96, 97, and 98 are uniform, that is, equal. Then, in this example, the plurality of protrusions 91, 92, 93, 94, 95, 96, 97, and 98 pass through the maximum tire width position H.

The protrusion 91 is provided to the tire side portion S on the outer side of the vehicle 100 on which the tire is mounted. The protrusion 91 includes an end portion 91T1 in the counterclockwise direction and an end portion 91T2 in the clockwise direction with respect to a center of rotation (rotation axis) P of the pneumatic tire 1, on the tire side portion S on the outer side of the vehicle 100. The end portion 91T1 of the protrusion 91 is positioned on the inner side in the tire radial direction of the end portion 91T2. As a result, the protrusion 91 extends in a direction that intersects the tire radial direction. Note that, as illustrated in FIG. 3B, in reverse of FIG. 3A, the end portion 91T2 may be positioned on the inner side in the tire radial direction of the end portion 91T1. Further, a convex portion side of the arc may face the direction of the center of rotation P of the pneumatic tire 1.

The protrusion 91 has an arc shape as viewed from the outer side of the vehicle 100 in the direction along the rotation axis P of the pneumatic tire 1, and the recessed portion side of the arc faces the direction of the center of rotation P of the pneumatic tire 1.

The other protrusions 92, 93, 94, 95, 96, 97, and 98 are the same as the protrusion 91. Note that, in the description below, the protrusions 91, 92, 93, 94, 95, 96, 97, and 98 are generally called "protrusions 9".

Advantages of Protrusion

Figure 4A:
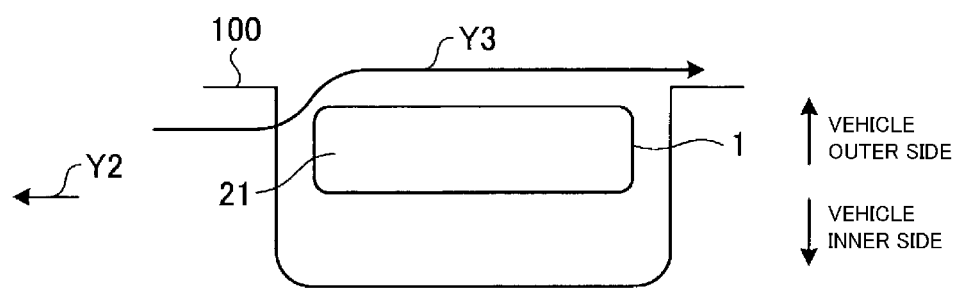
FIG. 4A is a diagram illustrating an air flow around a periphery of a tire including a tire side portion not provided with protrusions.
Figure 4B:
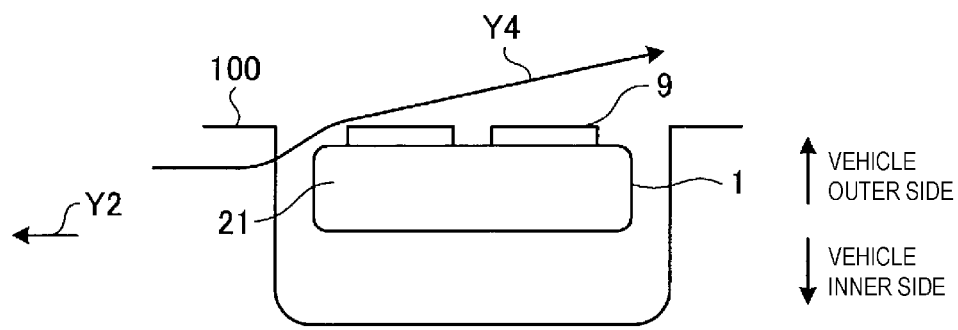
FIG. 4B is a diagram illustrating the air flow around the periphery of a tire including a tire side portion provided with protrusions.

FIG. 4A and FIG. 4B explain the advantages of providing the protrusions. FIG. 4A is a diagram illustrating the air flow around a periphery of a tire including a tire side portion not provided with protrusions. FIG. 4B is a diagram illustrating the air flow around a periphery of a tire including a tire side portion provided with protrusions. Note that FIG. 4A and FIG. 4B illustrate the state of the pneumatic tire 1 when the tread surface 21 is viewed upward from the road surface.

When the protrusions are not provided to the tire side portion of the pneumatic tire 1, as illustrated in FIG. 4A, the air flow indicated by the arrow Y3 is substantially parallel with the surface (not illustrated) orthogonal to the rotation axis P of the pneumatic tire 1 in contrast with the arrow Y2 indicating the advancement direction of the vehicle 100.

In contrast, when the protrusions 9 are provided to the tire side portion S of the pneumatic tire 1, as illustrated in FIG. 4B, the air flow indicated by the arrow Y4 is in a direction away from the surface (not illustrated) orthogonal to the rotation axis P of the pneumatic tire 1, that is, in a direction away from the vehicle 100, in contrast with the arrow Y2 indicating the advancement direction of the vehicle 100, as illustrated in FIG. 4B. As a result, the density of the air between the floor of the vehicle 100 and the road surface decreases. Thus, a downforce occurs. The action of the downforce contributes to improvement in the steering stability performance of the vehicle 100, for example.

The protrusions 9 are disposed on at least one tire side portion S and, as long as the pneumatic tire 1 is mounted to the vehicle 100 with the tire side portion S provided with the protrusions 9 facing the vehicle outer side, the air flow of the tire side portion S on the vehicle outer side can be pushed out to the vehicle outer side, increasing the downforce. Then, by making the shape of the protrusions 9 appropriate, it is possible to increase the downforce while maintaining good uniformity of the pneumatic tire 1. Below, the arrangement and shape of the protrusions 9 for increasing the downforce while maintaining good uniformity of the pneumatic tire 1 will be described.

Arrangement of Protrusions

Figure 5:
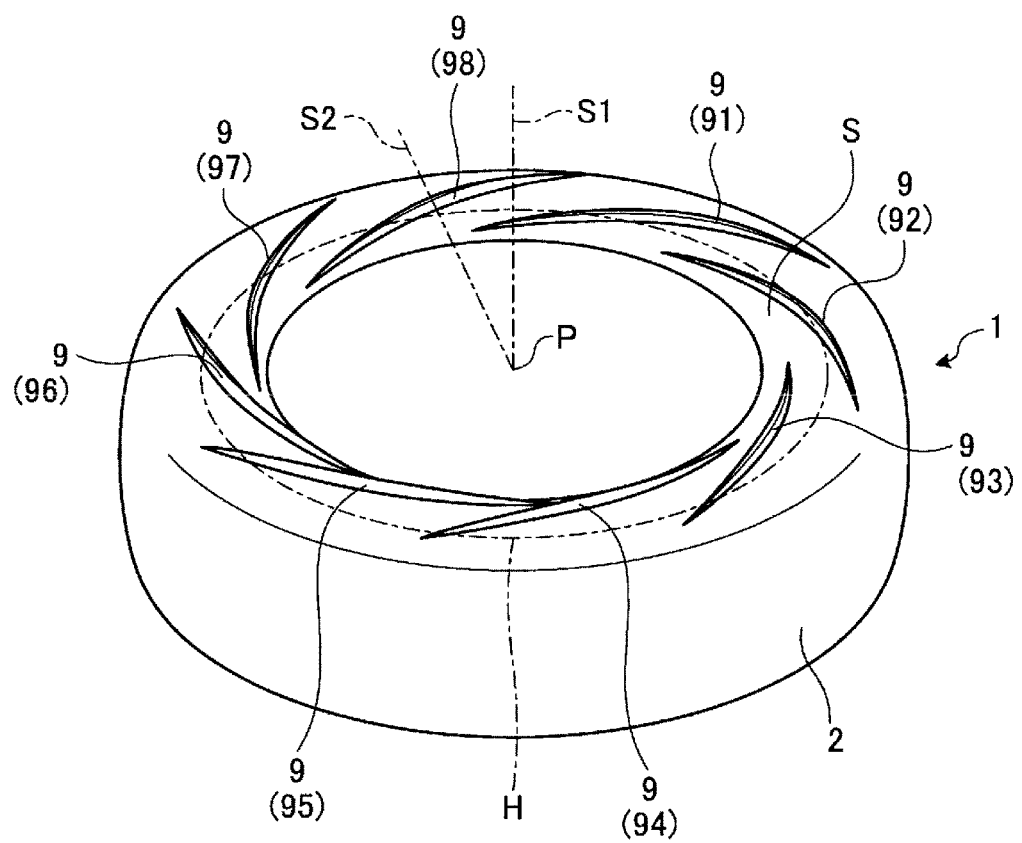
FIG. 5 is a diagram illustrating an example of an arrangement of the protrusions on the tire side portion.

FIG. 5 is a diagram illustrating an example of the arrangement of the protrusions 9 on the tire side portion S. FIGS. 6A to 6D are diagrams for explaining a mass per unit length and a cross-sectional area of the protrusions 9.

As illustrated in FIG. 5, a first straight line 51 and a second straight line S2 that pass through the center of rotation P and extend in the tire radial direction are presumed. The first straight line 51 and the second straight line S2 each have different positions in the tire circumferential direction.

The first straight line 51 traverses the protrusion 91. Further, the first straight line 51 traverses the protrusion 98. The position where the first straight line 51 traverses the protrusion 91 and the position where the first straight line 51 traverses the protrusion 98 differ in the tire radial direction. The second straight line S2 traverses the protrusion 98. The second straight line S2 does not traverse the protrusion 91. That is, in this example, the first straight line S1 traverses the two or more protrusions 91, 98, and the second straight line S2 traverses the one protrusion 98.

At this time, the protrusions 91 and the protrusion 98 overlap in the radial direction along the first straight line S1. The protrusion 98 does not overlap with any other protrusion in the radial direction along the second straight line S2.

Mass of Protrusions

When the first straight line S1 and the second straight line S2 have a relationship such as described above with the protrusions 9, the ratio of the total mass per unit length of the protrusions 9 traversed by the first straight line S1 to the total mass per unit length of the protrusions traversed by the second straight line S2 is set to 0.8 to 1.2, both inclusive (that is, a value close to "1").

Figure 6A:
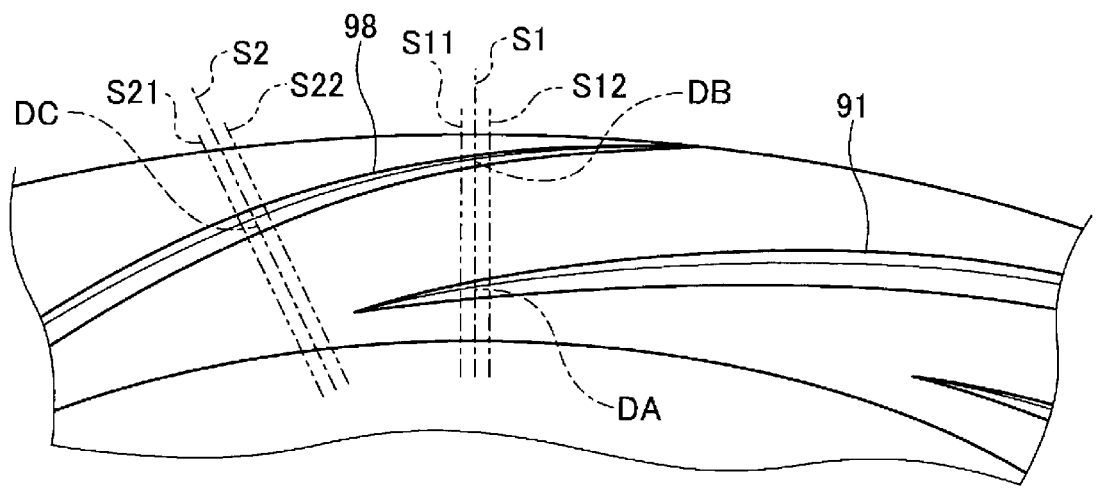
FIG. 6A is a diagram for explaining a mass per unit length and a cross-sectional area of the protrusions.

The unit length of the protrusion 91 is, for example, 1 mm. The mass per unit length of the protrusion 91 will now be described with reference to FIG. 6A. In FIG. 6A, a straight line S11 and a straight line S12, obtained by moving the first straight line S1 to both sides by 0.5 mm each with the first straight line S1 at the center, are presumed. The space between the straight line S11 and the straight line S12 is 1 mm (unit length). That is, the mass per unit length of each of the protrusions 9 traversed by a straight line is the mass of the protrusion included in the range where the width in the direction orthogonal to the center line is the unit length, with the straight line extending in the radial direction serving as the center line. Then, of the material that constitutes the protrusion 91, the mass of the section included between the surface (not illustrated) that includes the straight line S11 and is parallel with the rotation axis P and the surface (not illustrated) that includes the straight line S12 and is parallel with the rotation axis P is the mass per unit length (g/mm) of the protrusion 91.

Similarly, of the material that constitutes the protrusion 98, the mass of the section included between the surface (not illustrated) that includes the straight line S11 and is parallel with the rotation axis P and the surface (not illustrated) that includes the straight line S12 and is parallel with the rotation axis P is the mass per unit length (g/mm) of the protrusion 98. Further, given the straight line S21 and the straight line S22 obtained by moving the second straight line S2 in parallel to both sides by 0.5 mm each, with the second straight line S2 serving as the center, the mass of the material that constitutes the protrusion 98 in the section included between the surface (not illustrated) that includes the straight line S21 and is parallel with the rotation axis P and the surface (not illustrated) that includes the straight line S22 and is parallel with the rotation axis P is the mass per unit length (g/mm) of the protrusion 98.

Then, as described above, the ratio of the total mass per unit length of the protrusions 91 and the protrusion 98 traversed by the first straight line S1 to the total mass per unit length of the protrusion 98 traversed by the second straight line S2 is set to a value close to "1". Given any first straight line and second straight line that pass through the center of rotation P of the pneumatic tire 1 and extend in the tire radial direction, good uniformity of the pneumatic tire 1 can be achieved as long as the ratio of the total mass per unit length of each of the protrusions 9 traversed by the straight lines is a value close to "1".

Cross-Sectional Area of Protrusions

Further, when the first straight line S1 and the second straight line S2 have a relationship such as described above with the protrusions 9, the ratio of the cross-sectional area along the second straight line S2 of the one protrusion 98 traversed by the second straight line S2 to the total cross-sectional area along the first straight line S1 of the two or more protrusions 91, 98 traversed by the first straight line S1 is preferably from 0.8 to 1.2, both inclusive (that is, a value close to "1"). When the protrusions 9 are partially formed by a different material, the protrusions 9 can be, apart from or together with the mass per unit length described above, appropriately arranged so as to achieve good uniformity using the cross-sectional area as a reference.

Figure 6B:
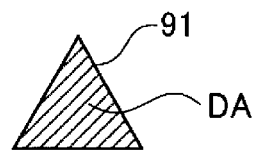
FIG. 6B is a diagram for explaining the mass per unit length and the cross-sectional area of the protrusions.
Figure 6C:
FIG. 6C is a diagram for explaining the mass per unit length and the cross-sectional area of the protrusions.
Figure 6D:
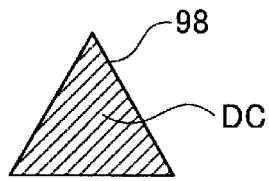
FIG. 6D is a diagram for explaining the mass per unit length and the cross-sectional area of the protrusions.

The cross section along the first straight line S1 of the protrusion 91 traversed by the first straight line S1 (the cross section along the surface that includes the first straight line S1 and is parallel with the rotation axis P) is, for example, a cross section DA illustrated in FIG. 6B. The cross section along the first straight line S1 of the protrusion 98 traversed by the first straight line S1 (the cross section along the surface that includes the first straight line S1 and is parallel with the rotation axis P) is, for example, a cross section DB illustrated in FIG. 6C. The cross section along the second straight line S2 of the protrusion 98 traversed by the second straight line S2 (the cross section along the surface that includes the second straight line S2 and is parallel with the rotation axis P) is, for example, a cross section DC illustrated in FIG. 6D.

Then, as described above, the ratio of the area of the cross section DC along the second straight line S2 of the protrusion 98 traversed by the second straight line S2 to the total cross-sectional area along the first straight line S1 of the two or more protrusions 91, 98 traversed by the first straight line S1 is set to a value close to "1". That is, given any first straight line and second straight line that pass through the center of rotation P of the pneumatic tire 1 and extend in the tire radial direction, good uniformity of the pneumatic tire 1 can be achieved as long as the ratio of the total cross-sectional areas of the protrusions 9 traversed by the straight lines is close to "1".

Note that to achieve such relationships of mass and cross-sectional area as described above, the shape or the length of the protrusions may be creatively set or the number of protrusions may be increased or decreased accordingly. For example, such relationships of mass and cross-sectional area as described above may be achieved by making each of the protrusions 9 have a shape in which the height of the central portion is greater than the height of both end portions. When the height of both end portions and the height of the central portion of the protrusions 9 are the same, such relationships of mass and cross-sectional area as described above can be achieved as long as, given any two straight lines, the protrusions 9 are disposed so that the number of protrusions overlapping in the radial direction are the same.

Height and width of protrusions

Figure 7A:
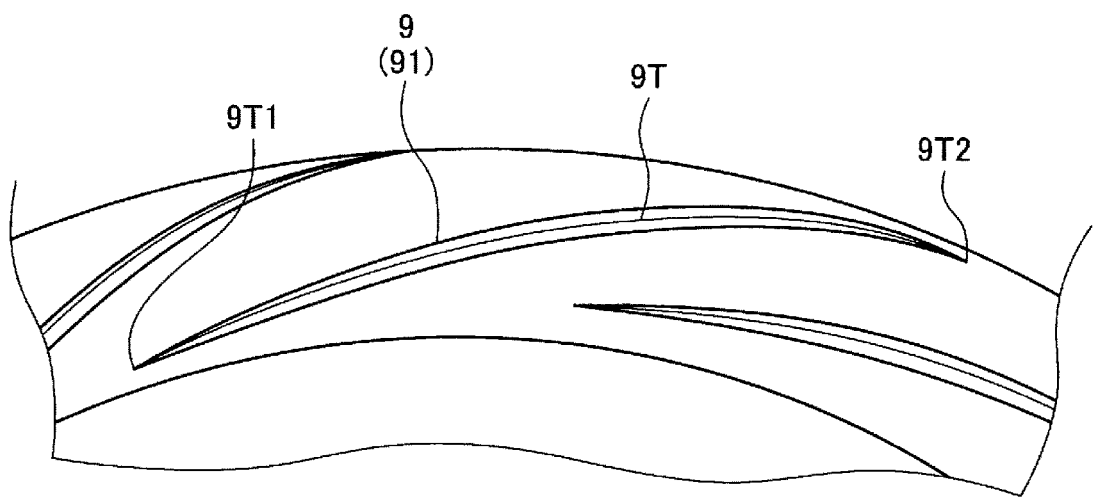
FIG. 7A is a diagram for explaining a height and a width of the protrusions.
Figure 7B:
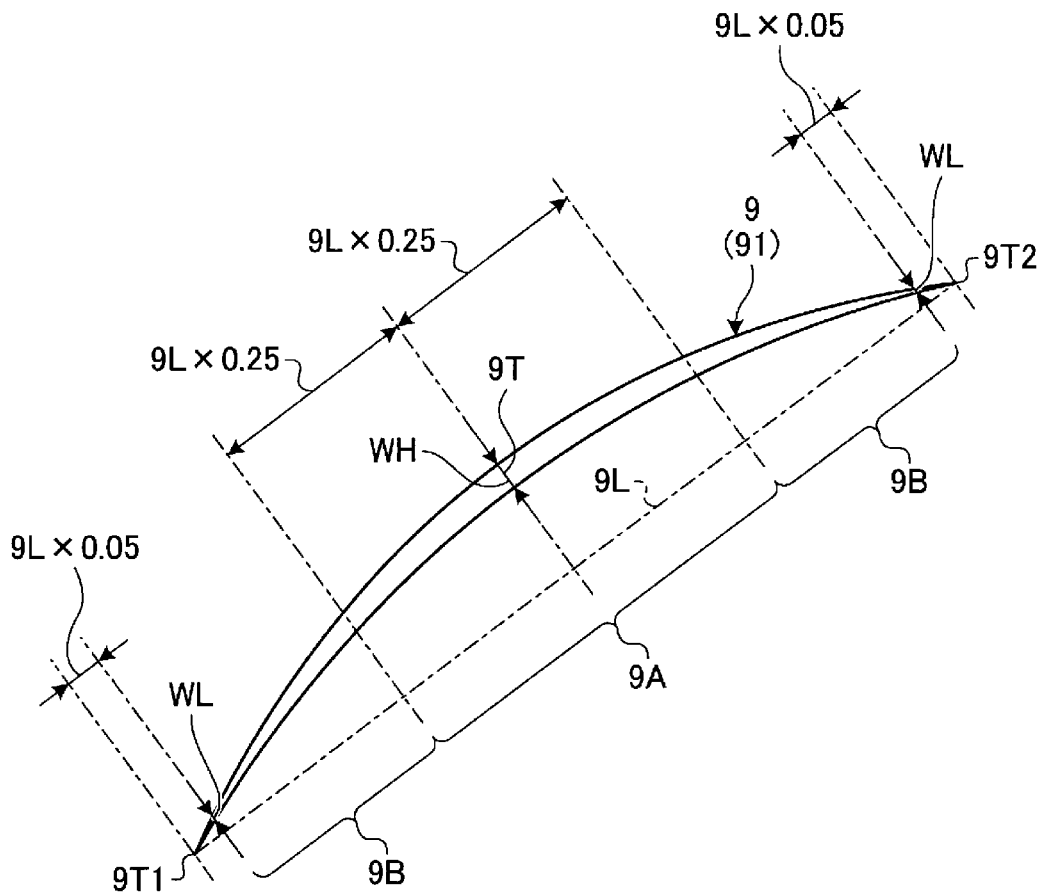
FIG. 7B is a diagram for explaining the height and the width of the protrusions.
Figure 7C:
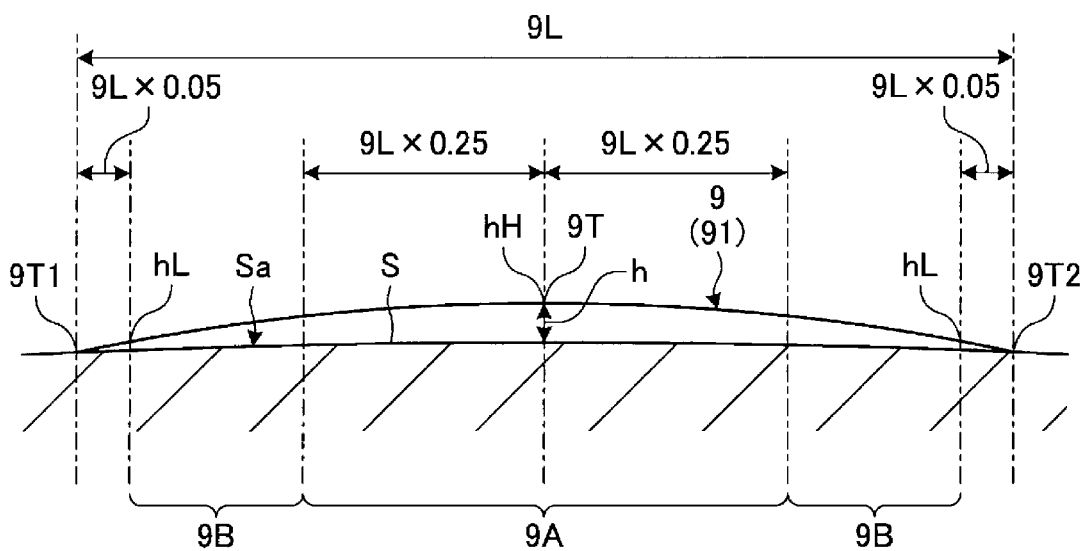
FIG. 7C is a diagram for explaining the height and the width of the protrusions.

FIGS. 7A to 7C are diagrams for explaining a height h and a width W of the protrusions 9. FIG. 7B is an enlarged view of a protrusion as viewed from the side of the pneumatic tire, and FIG. 7C is a side view of the protrusion. In the protrusion 9 illustrated in FIGS. 7A to 7C, the height of a central portion 9T is greater than the height of an end portion 9T1 and an end portion 9T2. With the protrusion 9 thus given a shape in which the height of the central portion is greater than the height of both end portions, it is possible to achieve such relationships of mass and cross-sectional area as described above.

Specifically, the protrusions 9 each include an intermediate portion 9A in the extension direction, and leading edge portions 9B provided continuously at both ends in the extension direction of the intermediate portion 9A, as illustrated in FIG. 7B and FIG. 7C. The intermediate portion 9A is a section within a range of 25% of a length 9L on both sides in the extension direction from the central portion 9T of the length 9L in the extension direction of the protrusion 9. The leading edge portion 9B is provided so as to further extend to both sides in the extension direction of the intermediate portion 9A, and is a section in a range that excludes 5% of the length 9L in the extension direction of the protrusion 9 from each of the end portions 9T1, 9T2 in the extension direction. The length 9L of the protrusion 9 in the extension direction is the shortest (straight line) distance between each of the end portions 9T1, 9T2 of the protrusion 9.

Then, the intermediate portion 9A includes a maximum position hH of the projection height h from the tire side surface Sa. Further, the leading edge portion 9B includes a minimum position hL of the projection height h from the tire side surface Sa. In FIG. 7C, the projection height h of the protrusion 9 in the extension direction gradually increases from one end portion 9T1 to the central portion 9T, and gradually decreases from the central portion 9T toward the other end portion 9T2. In this case, the maximum position hH of the projection height h matches that of the central portion 9T, and the minimum position hL matches that of the ends of the leading edge portions 9B, which are at a position of 5% of the length 9L from the end portion 9T1 and the end portion 9T2. Note that while the projection height h of the protrusions 9 in the extension direction changes on an arc in FIG. 7C, the height is not limited thereto and may change linearly. Further, the maximum position hH may be for the intermediate portion 9A overall and, in this case, the projection height h of the leading edge portion 9B may gradually decrease from the intermediate portion 9A. In this way, the maximum position hH of the intermediate portion 9A of the protrusions 9 is greater than the minimum position hL of both leading edge portions 9B.

Further, with the pneumatic tire 1 of this embodiment, the projection height h of the intermediate portion 9A of the protrusions 9 is preferably from 1 mm to 10 mm, both inclusive.

When the projection height h of the intermediate portion 9A is less than 1 mm, the air flow of the tire side portion S on the vehicle outer side is pushed to the vehicle outer side, making it difficult to achieve action such as generation of a turbulent flow boundary layer described later. On the other hand, when the projection height h of the intermediate portion 9A exceeds 10 mm, the air flow that collides with the protrusions 9 increases, tending to increase air resistance. Thus, to remarkably achieve the effect of increasing the downforce and reducing air resistance, the projection height h of the intermediate portion 9A is preferably from 1 mm to 10 mm, both inclusive.

Further, as illustrated in FIG. 7A and FIG. 7B, the width of the central portion 9T of the protrusions 9 is greater than the width of the end portion 9T1 and the end portion 9T2. With the protrusions 9 thus given a shape in which the width of the central portion 9T is greater than the width of both end portions, it is possible to achieve such relationships of mass and cross-sectional area as described above.

Specifically, as illustrated in FIG. 7B, the intermediate portion 9A of the protrusion 9 includes the maximum width position WH. Further, the leading edge portion 9B of the protrusions 9 includes the minimum width position WL. In FIG. 7B, the width W of the protrusions 9 gradually increases from one end portion 9T1 to the central portion 9T, and gradually decreases from the central portion 9T toward the other end portion 9T2. In this case, the maximum width position WH of the width W matches that of the central portion 9T, and the minimum width position WL matches that of the ends of the leading edge portions 9B, which are at a position of 5% of the length 9L from the end portion 9T1 and the end portion 9T2. Note that while the width W of the protrusions 9 changes on an arc in FIG. 7B, the width W is not limited thereto and may change linearly. Further, the maximum width position WH may be for the intermediate portion 9A in its entirety and, in this case, the width W of the leading edge portion 9B may gradually decrease from the intermediate portion 9A. Note that, in the present embodiment, the width W of the protrusions 9 is the dimension in the direction orthogonal to the length 9L in the extension direction of the protrusion 9. In this way, the maximum width position WH of the intermediate portion 9A of the protrusions 9 is greater than the minimum width position WL of both leading edge portions 9B.

Note that, in the pneumatic tire 1 of the embodiment described above, the width W of the protrusions 9 in the lateral direction is preferably from 0.5 mm to 10.0 mm, both inclusive. When the width W of the protrusions 9 in the lateral direction is less than the above range, the range in which the protrusions 9 come into contact with the air flow is small, making it difficult to achieve the effect of improving air flow stagnation by the protrusions 9. On the other hand, when the width W of the protrusions 9 in the lateral direction exceeds the range above, the range in which the protrusions 9 come into contact with the air flow is large, making the protrusions 9 cause an increase in air resistance as well as an increase in tire weight. Thus, appropriately setting the width W of the protrusions 9 in the lateral direction makes it possible to remarkably achieve the effect of improving air flow stagnation by the protrusions 9.

Overlap of Protrusions

Figure 8:
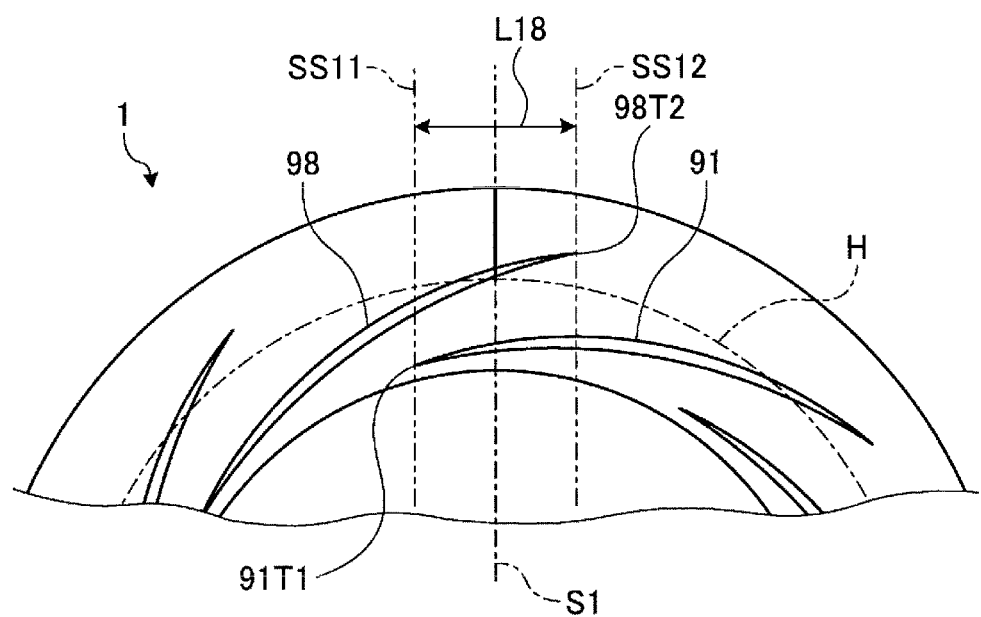
FIG. 8 is a diagram for explaining a length of the protrusions.

FIG. 8 is a diagram for explaining the length of the protrusions 9. As illustrated in FIG. 8, the position where the first straight line S1 traverses the protrusion 91 and the position where the first straight line S1 traverses the protrusion 98 differ in the tire radial direction. Thus, the two protrusions 91, 98 overlap in the radial direction along the first straight line S1.

Here, a straight line SS11 that passes through the end portion 91T1 of the protrusion 91 and is parallel with the first straight line S1, and a straight line SS12 that passes through an end portion 98T2 of the protrusion 98 and is parallel with the first straight line S1 are presumed. At this time, a distance between the straight line SS11 and the straight line SS12 is a length L18 of the overlapping section of the protrusion 91 and the protrusion 98.

The length L18 of the overlapping section of the protrusion 91 and the protrusion 98 is from 20% to 60%, both inclusive, of the length of the protrusion 91, and from 20% to 60%, both inclusive, of the length of the protrusion 98.

The length 9L (illustrated in FIG. 7B and FIG. 7C) of the protrusions 9 is, for example, preferably a length that exceeds 30% of the height of the range SD of the tire side portion S.

Figure 9:
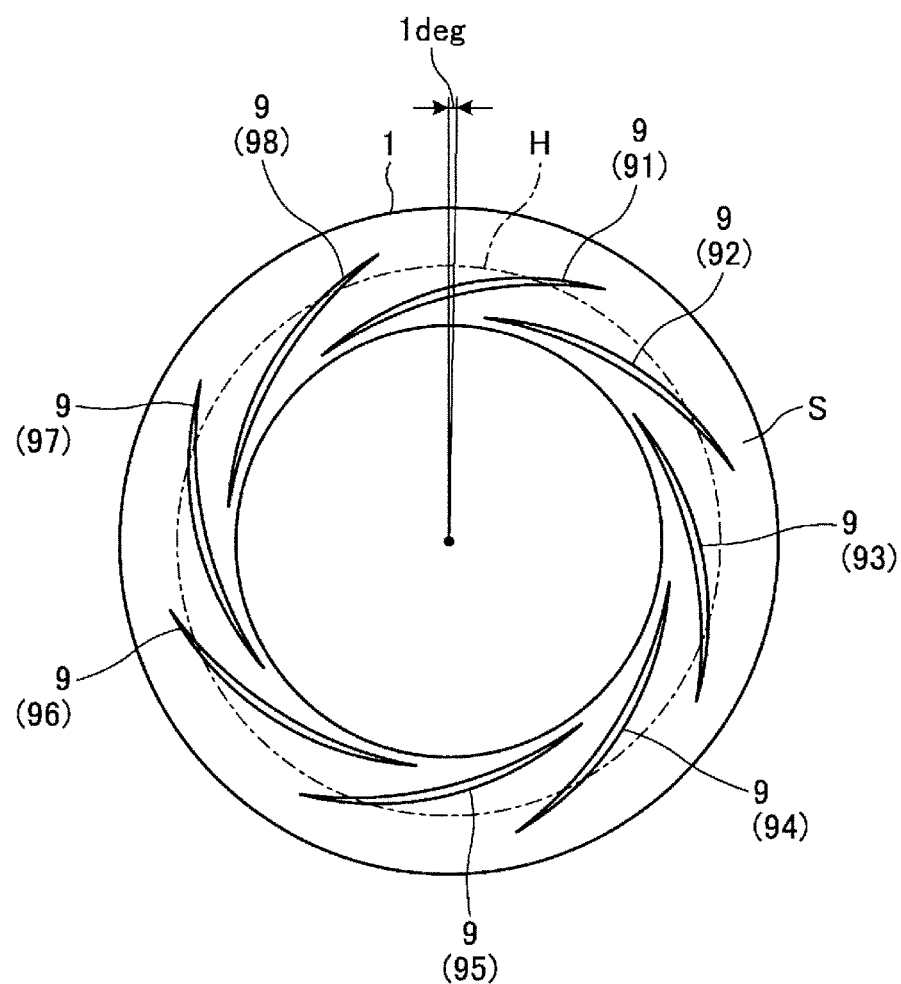
FIG. 9 is a diagram for explaining a mass change of the protrusions in a tire circumferential direction.
Figure 10:
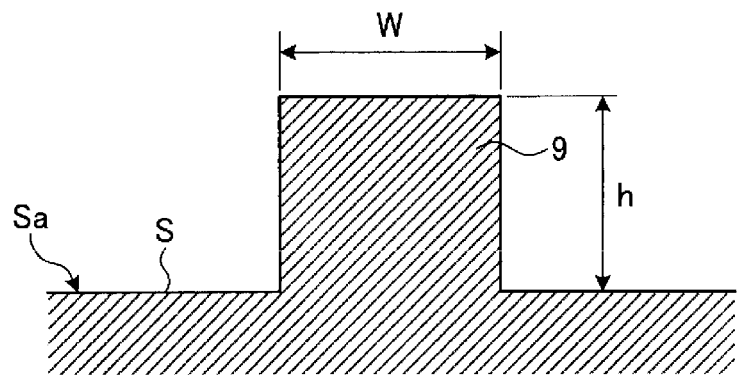
FIG. 10 is a cross-sectional view in a lateral direction of a protrusion.

As long as the length of the protrusions is such a length, and the length of the overlapping section of the protrusions in the radial direction is the above-described range, it is possible to increase the downforce while maintaining good uniformity. Mass change of protrusions in tire circumferential direction FIG. 9 is a diagram for explaining a mass change of the protrusions 9 in a tire circumferential direction. As illustrated in FIG. 9, an amount of fluctuation in the tire circumferential direction of the mass of the protrusions 9 per degree in the tire circumferential direction is preferably 0.2 g/degree or less, with the protrusions 9 cross-sectionally cut from the center of rotation (rotation axis) P in the tire radial direction.

Specifying the amount of fluctuation of the mass in the tire circumferential direction that includes the protrusions 9 improves the homogeneity in the tire circumferential direction, making it possible to remarkably achieve the effect of good uniformity.

Cross-Sectional Shape of Protrusions

FIGS. 10 to 21 are diagrams illustrating examples of the cross section of the protrusions 9 in the lateral direction. The protrusion 9 illustrated in FIG. 10 has a cross-sectional shape in the lateral direction orthogonal to the extension direction that is a quadrangular shape. The protrusion 9 illustrated in FIG. 11 has a cross-sectional shape in the lateral direction that is a triangular shape. The protrusion 9 illustrated in FIG. 12 has a cross-sectional shape in the lateral direction that is a trapezoidal shape.

Also, the cross-sectional shape in the lateral direction of the protrusions 9 may have an external form based on curved lines. The protrusion 9 illustrated in FIG. 13 has a cross-sectional shape in the lateral direction that is a semi-circular shape. In addition, while not explicitly illustrated, the cross-sectional shape in the lateral direction of the protrusions 9 may be various shapes based on an arc such as, for example, a semi-oval shape or a semi-elliptical shape.

Figure 14:
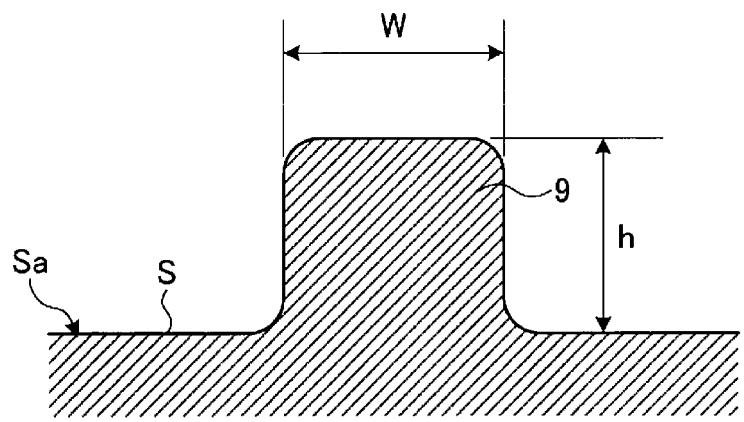
FIG. 14 is a cross-sectional view in the lateral direction of a protrusion.
Figure 15:
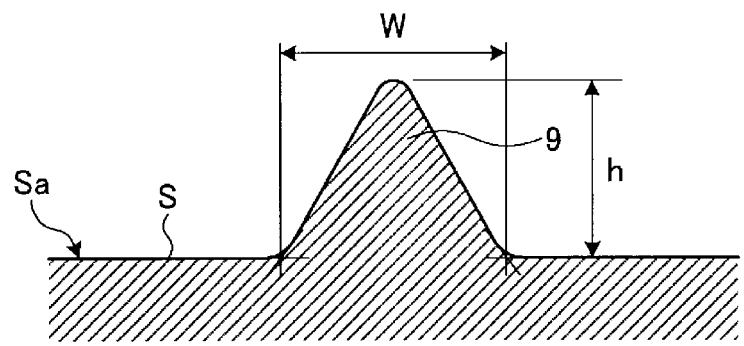
FIG. 15 is a cross-sectional view in the lateral direction of a protrusion.
Figure 16:
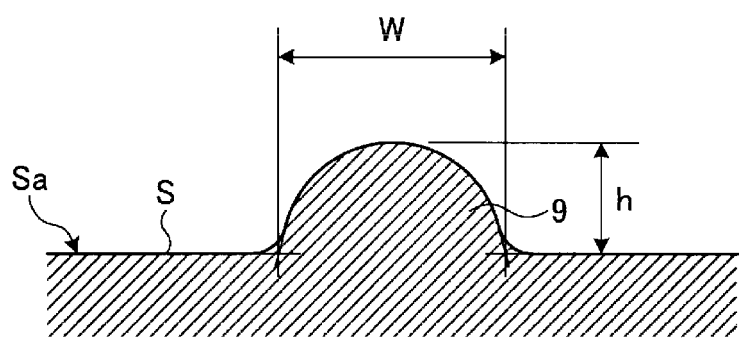
FIG. 16 is a cross-sectional view in the lateral direction of a protrusion.
Figure 17:
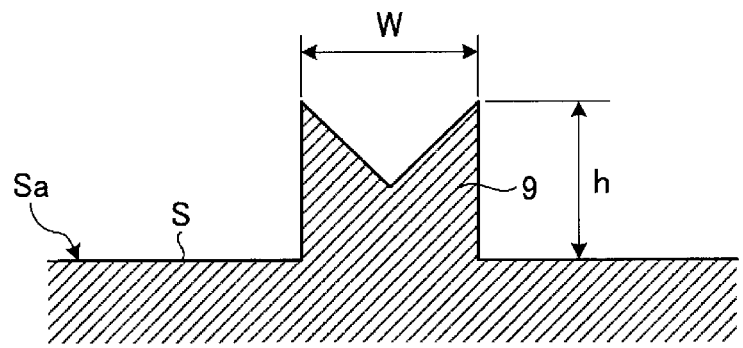
FIG. 17 is a cross-sectional view in the lateral direction of a protrusion.
Figure 18:
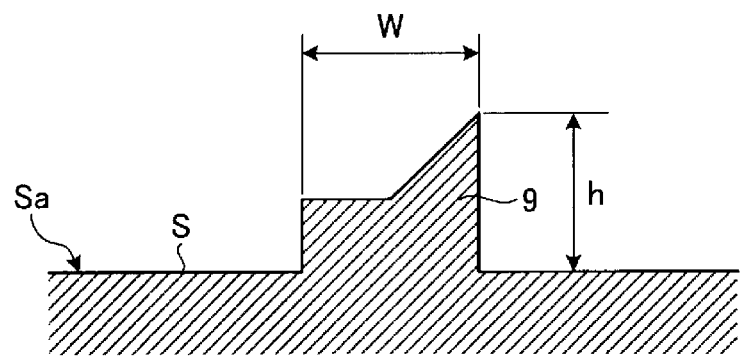
FIG. 18 is a cross-sectional view in the lateral direction of a protrusion.
Figure 19:
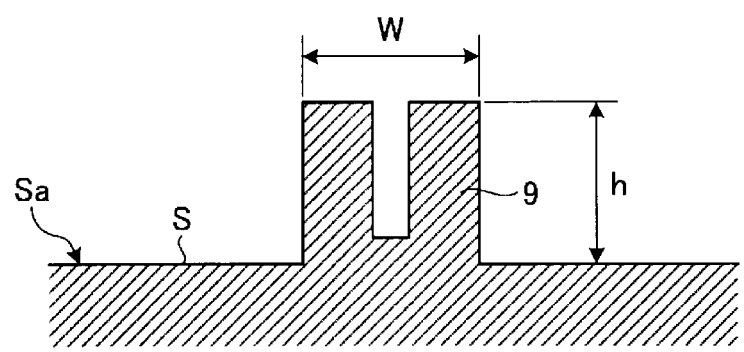
FIG. 19 is a cross-sectional view in the lateral direction of a protrusion.
Figure 20:
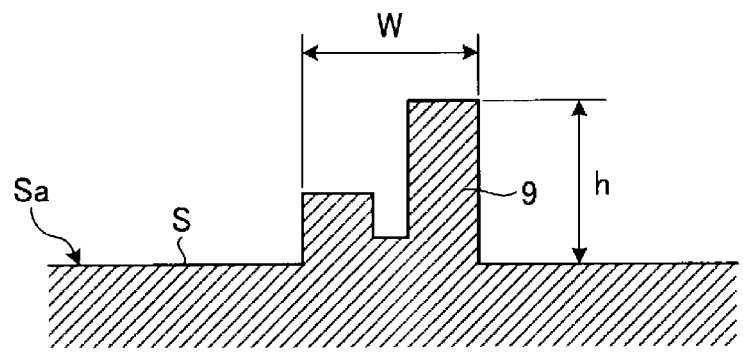
FIG. 20 is a cross-sectional view in the lateral direction of a protrusion.
Figure 21:
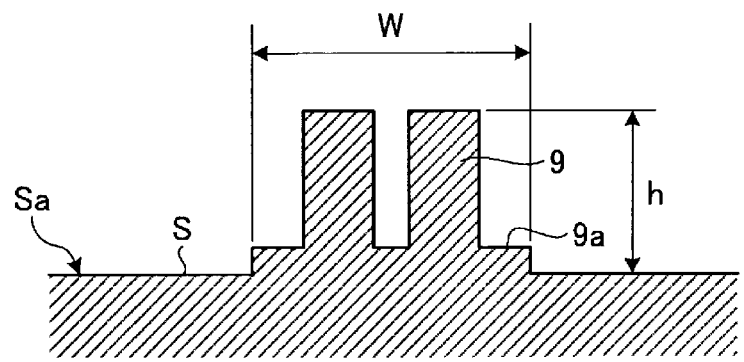
FIG. 21 is a cross-sectional view in the lateral direction of a protrusion.

Also, the cross-sectional shape in the lateral direction of the protrusions 9 may have an external form that is a combination of straight lines and curves. The protrusion 9 illustrated in FIG. 14 has a cross-sectional shape in the lateral direction that is a rectangular shape with curved corners. The protrusion 9 illustrated in FIG. 15 has a cross-sectional shape in the lateral direction that is a triangular shape with curved corners. Also, as illustrated in FIGS. 14 to 16, the cross-sectional shape in the lateral direction of the protrusions 9 may be a shape in which the base portion that projects from the tire side portion S is curved.

Also, the cross-sectional shape in the lateral direction of the protrusions 9 may be a combination of various shapes. The protrusion 9 illustrated in FIG. 17 has a zigzag shape formed by a plurality (two in FIG. 17) of triangular shapes on top of a rectangular shape. The protrusion 9 illustrated in FIG. 18 has one triangular shape protruding on top of a rectangular shape. The protrusion 9 illustrated in FIG. 19 has a recessed quadrangular shape on top of a rectangular shape. The protrusion 9 illustrated in FIG. 20 has a recessed quadrangular shape on the top of a rectangular shape, with both ends of the recess having different projection heights h. The protrusion 9 illustrated in FIG. 21 has a platform portion 9a with a quadrangular shape that protrudes from the tire side portion S, and a plurality (two in FIG. 21) of quadrangular shapes that protrude on an upper portion of the platform 9a. In addition, while not explicitly illustrated, the cross-sectional shape in the lateral direction of the protrusions 9 may be various shapes such as a waveform on top of a rectangular shape.

Figure 22:
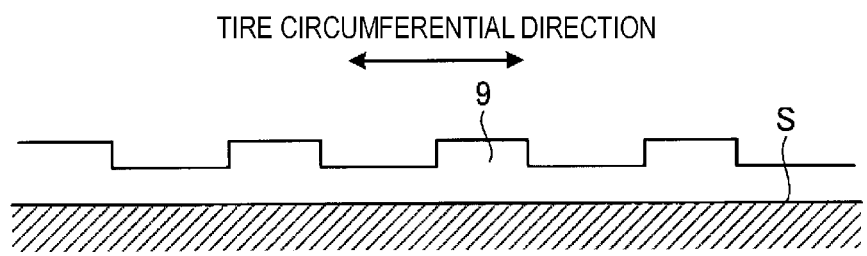
FIG. 22 is a side view in a longitudinal direction of a protrusion.
Figure 23:
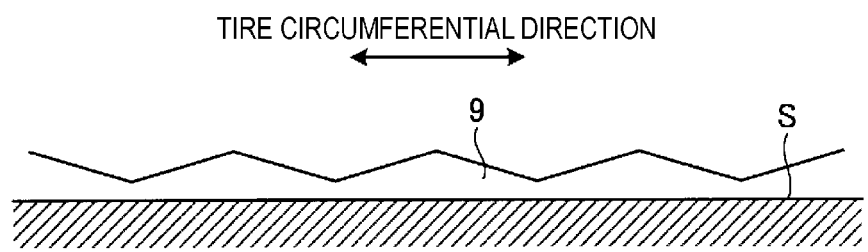
FIG. 23 is a side view in the longitudinal direction of a protrusion.

Also, the protrusions 9 may be formed with a uniform cross-sectional shape in the longitudinal direction (the projection height h from the tire side portion S or the width W in the lateral direction), or may be formed with a cross-sectional shape in the longitudinal direction (the projection height h from the tire side portion S) that varies as illustrated in the side views in the longitudinal direction of the protrusions 9 in FIG. 22 and FIG. 23. The protrusion 9 illustrated in FIG. 22 has a projection end from the tire side portion S in the longitudinal direction that is formed in an uneven shape (teeth comb shape). The protrusion 9 illustrated in FIG. 23 has a projection end from the tire side portion S in the longitudinal direction that is formed in an uneven shape (zigzag shape). In addition, while not explicitly illustrated in FIG. 23, the protrusion 9 may have a projection end from the tire side portion S in the longitudinal direction that is formed in an uneven shape (wave shape). In addition, while not illustrated in FIG. 23, the protrusion 9 may have a lateral width in the longitudinal direction that changes.

Figure 24A:
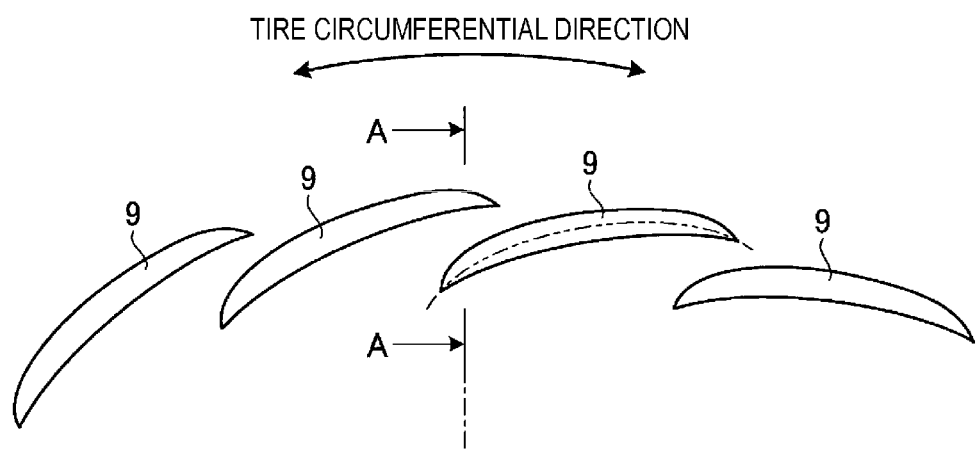
FIG. 24A is an appearance view of the protrusions.
Figure 24B:
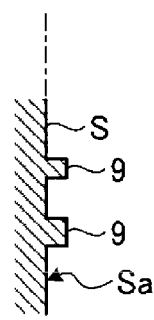
FIG. 24B is a cross-sectional view along A-A in FIG. 24A.

FIG. 24A is an appearance view of the protrusions 9, and FIG. 24B is a cross-sectional view along A-A in FIG. 24A. As illustrated in FIG. 24A and FIG. 24B, the protrusions 9 are formed so as to curve and extend in the longitudinal direction, and the center line in the longitudinal direction is formed so as to include many more components in the tire circumferential direction than components in the tire radial direction, that is, so that the angle with the tangent line in the tire circumferential direction is less than 90 degrees.

Figure 25A:
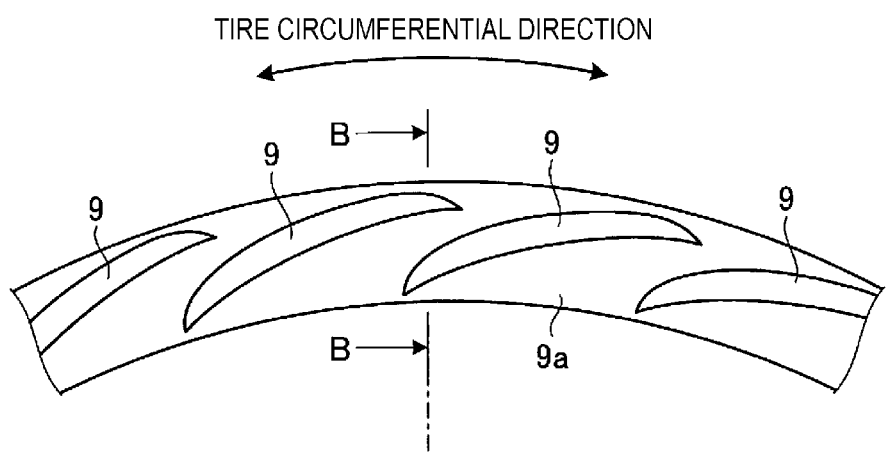
FIG. 25A is an appearance view of the protrusions.
Figure 25B:
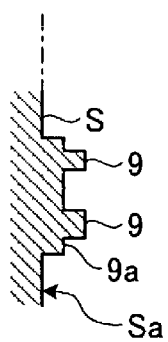
FIG. 25B is a cross-sectional view along B-B in FIG. 25B.

Further, FIG. 25A is an appearance view of the protrusions 9, and FIG. 25B is a cross-sectional view along A-A in FIG. 25A. As illustrated in FIG. 25A and FIG. 25B, the platform portion 9a having a long, quadrangular shape in the tire circumferential direction projects from the tire side portion S, and the protrusions 9 illustrated in FIG. 24A and FIG. 24B project on the upper portion of the platform portion 9a.

Also, in the tire width direction, the protrusions 9 may be provided on the tire side portions S on both sides, or may be provided on the tire side portion S on one side.

Thus, in the pneumatic tire 1 of the present embodiment, the protrusions 9 that mainly extend longitudinally in the tire circumferential direction are arranged on the outer side in the tire radial direction of the maximum tire width position H on at least one side portion S of the tire.

According to this pneumatic tire 1, the protrusions 9 generate a turbulent flow in the air that passes through the tire side portion S. Therefore, a turbulent flow boundary layer is generated on the periphery of the pneumatic tire 1, suppressing expansion of the air that escapes to the vehicle outer side at the vehicle trailing side. As a result, the spread of the passing air is suppressed, so the air resistance of the pneumatic tire 1 is reduced, and the fuel economy can be improved. Moreover, the protrusions 9 have a relatively simple structure, mainly extending longitudinally in the tire radial direction. As a result, structure complexity is suppressed, making it possible to reduce the manufacturing cost of the pneumatic tire 1.

Groove and Recessed Portion of Protrusions

However, when the protrusions 9 are provided to the tire side portion S, the rigidity of the section increases. Increasing the rigidity of the tire side portion S may have an effect on tire performance such as riding comfort. Here, a groove or slit and recessed portion may be provided to the protrusions 9 to suppress an increase in rigidity.

Figure 26A:
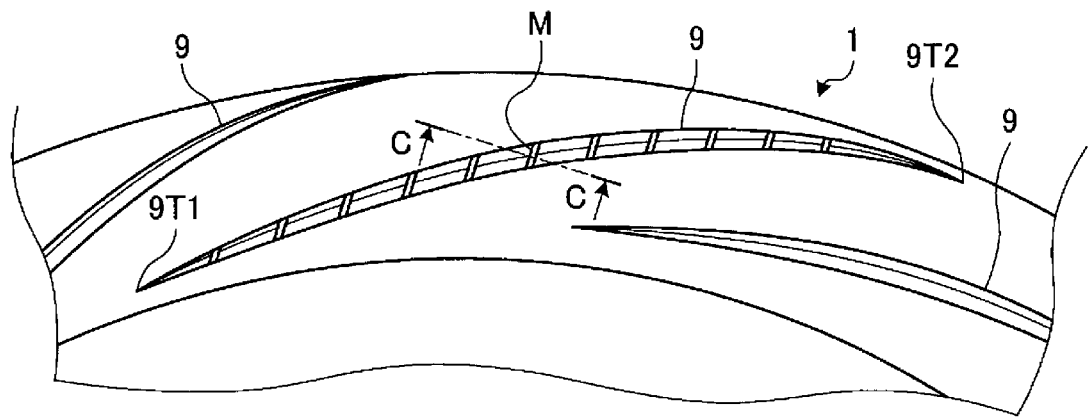
FIG. 26A is a diagram illustrating an example of a protrusion provided with grooves.
Figure 26B:
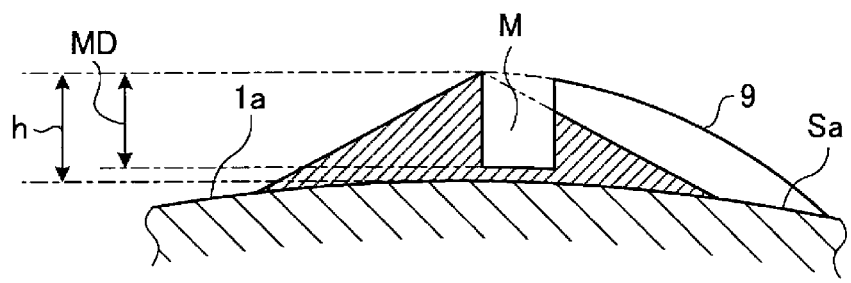
FIG. 26B is a cross-sectional view along C-C in FIG. 26A.

FIG. 26A is a diagram illustrating an example of a protrusion provided with grooves. FIG. 26B is a cross-sectional view along C-C in FIG. 26A.

As illustrated in FIG. 26A, the protrusions 9 provided to the tire side portion S of the pneumatic tire 1 each include a plurality of grooves M midway between both end portions 9Ta, 9T2, on the surface thereof. When the grooves M are provided, the protrusion 9 is partially divided by the grooves M, allowing the protrusion 9 to be considered physically separated into protrusions with the grooves M serving as boundaries. Nevertheless, when the width of the grooves M is 2 mm or less, the protrusion 9 serves as a protrusion as a whole, including the grooves M, without aerodynamic characteristics being problematic, and, without aerodynamic impact, the effect of increasing the downforce is unaffected.

As illustrated in FIG. 26B, a depth MD of the groove M may be, for example, less than the projection height h of the protrusion 9. The depth MD of the groove M may be, for example, a depth that does not reach a profile 1a (tire side surface Sa) of the pneumatic tire 1. Further, the depth MD of the groove M is, for example, preferably at most 90% of the projection height h to the profile 1a from a peak portion of the protrusion 9, which is the periphery of the groove M not including the groove M. Note that the triangular cross-sectional shape of the protrusion 9 in the lateral direction in FIG. 26B is an example.

The groove M may be provided to the entire protrusion 9 or to one section of the protrusion 9. The number of the grooves M may be one or a plurality. When the number of the grooves M is a plurality, the grooves M may be provided equally in the tire circumferential direction with the spaces therebetween constant, or the grooves M may be provided with the spaces therebetween different. With the groove M provided to the protrusions 9, an increase in the rigidity of the tire side portion S is suppressed compared to when the groove M is not provided, making it possible to prevent a decrease in riding comfort. Moreover, with the groove M formed, the mass of the protrusions 9 decreases, making it possible to suppress a reduction in uniformity caused by a mass increase of the tire side portion S resulting from the protrusions 9.

Figure 26C:
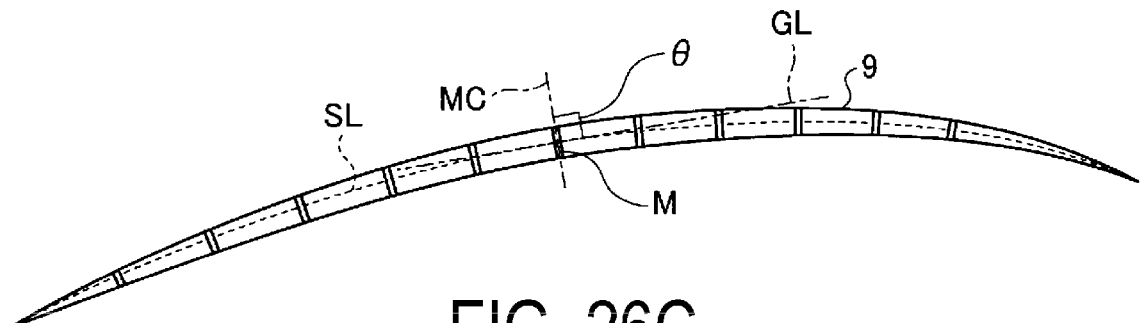
FIG. 26C is a diagram illustrating an example of an angle of the groove with respect to the protrusion.
Figure 26D:
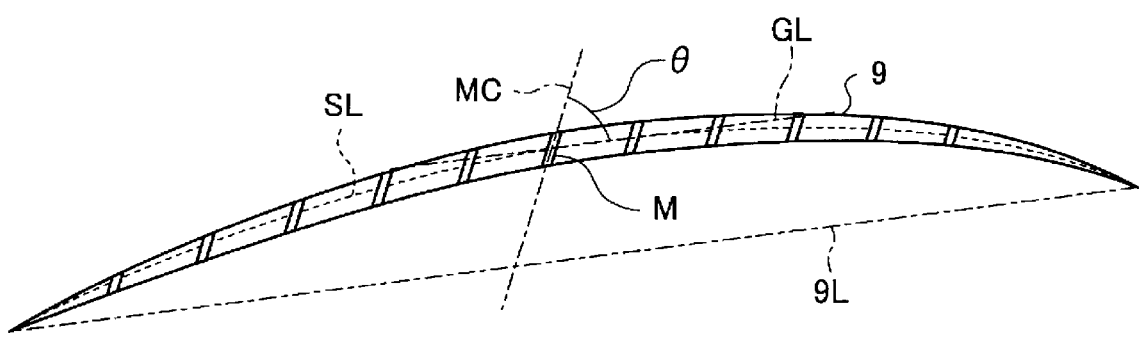
FIG. 26D is a diagram illustrating an example of the angle of the groove with respect to the protrusion.

FIG. 26C and FIG. 26D are diagrams illustrating an example of the angle of the groove M with respect to the protrusion 9. As illustrated in FIG. 26C, making each extending center line MC of the grooves M have the same angle θ (θ=90°, for example) with respect to a tangent line GL of a center line SL that passes through the center of the protrusion 9 in the lateral direction suppresses excessive mass change in the extension direction of the protrusion 9, and is therefore preferred. Further, as illustrated in FIG. 26D, each extending center line MC of the grooves M may, for example, have an angle θ other than 90 degrees with respect to the tangent line GL of the center line SL that passes through the center of the protrusion 9 in the lateral direction. Note that, in FIG. 26D, a plurality of the extending center lines MC of the grooves M are provided at a predetermined interval with respect to a length 9L so as to intersect the protrusion 9 in the extension direction. Further, the shape of the groove M does not need to be linear. For example, the shape of the groove M may be a curve, a bent line, or a wavy line.

Figure 27A:
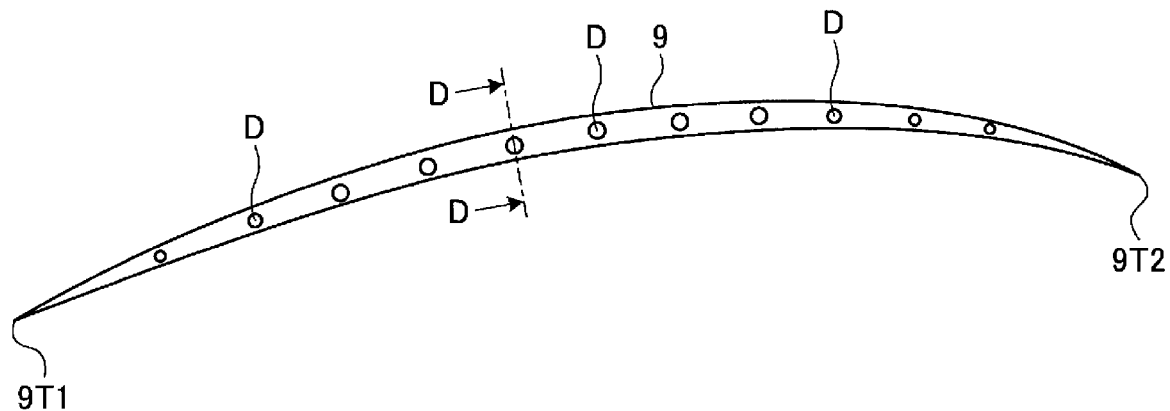
FIG. 27A is a diagram illustrating an example of a protrusion provided with grooves.
Figure 27B:
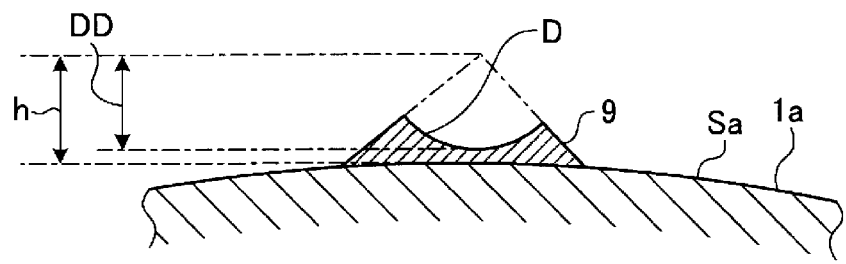
FIG. 27B is a cross-sectional view along D-D in FIG. 27A.

FIG. 27A is a diagram illustrating an example of a protrusion provided with recessed portions. FIG. 27B is a cross-sectional view along D-D in FIG. 27A. As illustrated in FIG. 27A, the protrusion 9 provided to the tire side portion S of the pneumatic tire 1 includes a plurality of recessed portions D midway between both end portions 9T1, 9T2 on the surface thereof. When the recessed portions D are provided, the protrusion 9 is partially divided by the recessed portions D, allowing the protrusion 9 to be considered physically separated into protrusions with the recessed portions D serving as boundaries. Nevertheless, when the opening diameter of the grooves M is 2 mm or less, the protrusion 9 serves as a protrusion as a whole, including the recessed portions M, without aerodynamic characteristics being problematic, and, without aerodynamic impact, the effect of increasing the downforce is unaffected.

As illustrated in FIG. 27B, a depth DD of the recessed portion D may be, for example, less than the projection height h of the protrusion 9. The depth DD of the recessed portion D may be, for example, a depth that does not reach the profile 1a (tire side surface Sa) of the pneumatic tire 1. Further, the depth DD of the recessed portion D is, for example, preferably at most 90% of the projection height h to the profile 1a from the peak portion of the protrusion 9, which is the periphery of the recessed portion D not including the recessed portion D. Note that the triangular cross-sectional shape of the protrusion 9 in the lateral direction in FIG. 27B is an example.

The recessed portion D may be provided to the entire protrusion 9 or to one section of the protrusion 9. The number of the recessed portions D may be one or a plurality. When the number of the recessed portions D is a plurality, the recessed portions D may be provided equally in the tire circumferential direction with the spaces therebetween constant, or the recessed portions D may be provided with the spaces therebetween different. With the recessed portion D provided to the protrusions 9, an increase in the rigidity of the tire side portion S is suppressed compared to when the recessed portion D is not provided, making it possible to prevent a decrease in riding comfort. Moreover, with the recessed portion D formed, the mass of the protrusions 9 decreases, making it possible to suppress a reduction in uniformity caused by the mass increase of the tire side portion S resulting from the protrusions 9.

Figure 28:
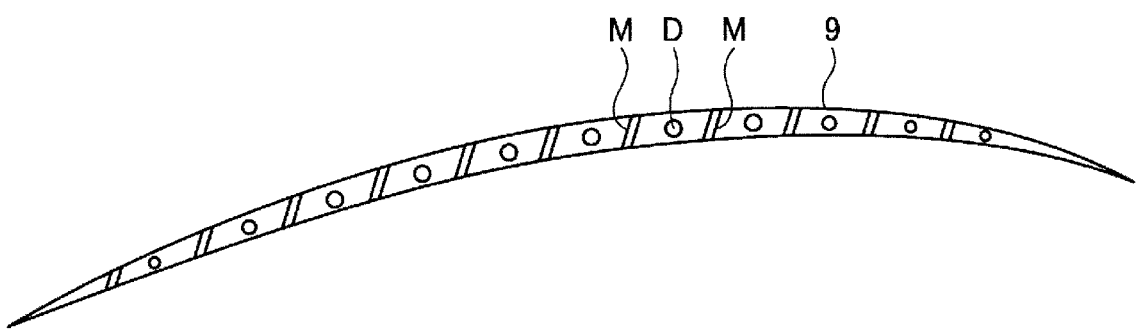
FIG. 28 is a diagram illustrating an example of a protrusion provided with grooves and recessed portions.

Further, in the pneumatic tire 1 of the present embodiment, the groove M and the recessed portion D are preferably formed on the surface of the protrusions 9 as illustrated in FIG. 28, which illustrates an example of the protrusion 9 provided with the grooves M and the recessed portions D.

With the groove M and the recessed portion D formed, the mass of the protrusions 9 decreases, making it possible to suppress a reduction in riding comfort caused by the tire side portion S being a rigid structure due to the protrusions 9. Moreover, with the groove M and the recessed portion D formed, the mass of the protrusions 9 decreases, making it possible to suppress a reduction in uniformity caused by the mass increase of the tire side portion S due to the protrusions 9. Note that while the groove M and the recessed portion D are alternately provided in the extension direction of the protrusion 9 in FIG. 28, provision is not limited thereto, allowing the groove M and recessed portion D to be disposed in a mixed manner as appropriate.

The groove M and the recessed portion D are preferably provided to a section of the tire side portion S where there is significant deflection. For example, the positions where the groove M and the recessed portion D are provided are preferably in a range that includes the maximum tire width position H, within the range SD of the tire side portion S.

Figure 29:
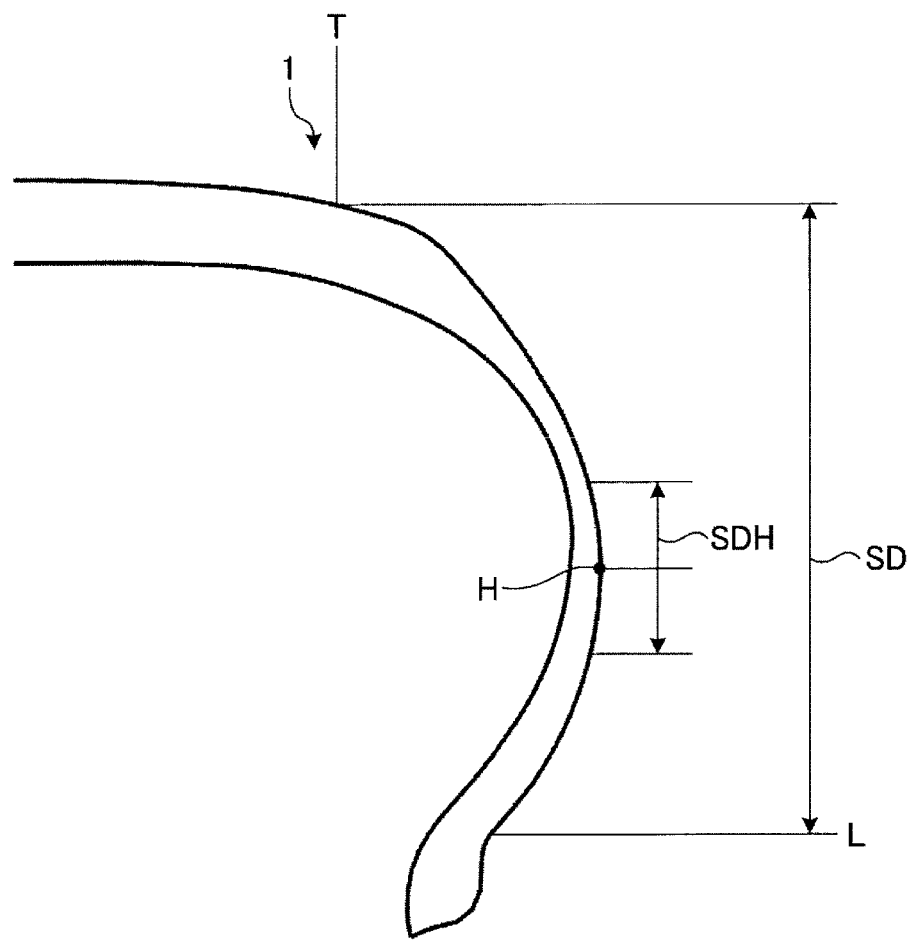
FIG. 29 is a diagram illustrating a range in which the grooves and the recessed portions are provided in the protrusions.

FIG. 29 is a diagram illustrating a range SDH in which the grooves M and the recessed portions D are provided to the protrusions. In FIG. 29, the grooves M and the recessed portions D are provided to a section within the range SDH of the protrusions 9 (not illustrated in FIG. 29) provided to the tire side portion S, for example. The height of the range SDH where the grooves M and the recessed portions D are provided is, for example, from 20% to 80%, both inclusive, of the height of the range SD of the tire side portion S, with the maximum tire width position H as the center. When the grooves M and the recessed portions D are provided to the protrusions 9 provided to this range SDH, an increase in the rigidity of the tire side portion S is suppressed, making it possible to prevent a decrease in riding comfort.

Further, according to the pneumatic tire 1 of the present embodiment, the spaces between each of the protrusions 9 in the tire circumferential direction are preferably not uniform.

According to this pneumatic tire 1, the periodicity of each of the protrusions 9 in the tire circumferential direction counteracts the air flow along the tire side surface Sa of the tire side portion S, and thus the sound pressure that occurs from each of the protrusions 9 mutually disperses or counteracts each other due to the difference in frequency, making it possible to reduce the noise (sound pressure level).

Note that the space between the protrusions 9 is indicated as an angle formed by drawing, in a side view of the pneumatic tire 1, additional lines (not illustrated) from the end portions 9T1, 9T2 of the protrusion 9 in the tire radial direction, with the center of rotation (rotation axis) P between the additional lines of the protrusions 9 serving as the center. Then, to make the spaces between the protrusions 9 non-uniform, the pitch in the tire circumferential direction can be changed while keeping the shape of the protrusions 9 (the projection height h, the width W, and the length 9L in the extension direction) as well as the intersection inclination in the tire circumferential direction and the tire radial direction the same; the shape (the projection height h, the width W, and the length 9L in the extension direction) can be changed; the intersection inclination in the tire circumferential direction and the tire radial direction can be changed; or the like.

Further, the pitch of the protrusions 9 in the tire circumferential direction may be an equal pitch or a difference pitch with respect to the pitch of the lug grooves of the tread portion 2 in the tire circumferential direction. When the pitch of the protrusions 9 in the tire circumferential direction is made to differ from the pitch of the lug grooves of the tread portion 2 in the tire circumferential direction, the sound pressure produced from the protrusions 9 and the sound pressure resulting from the lug grooves differ in frequency, resulting in mutual dispersion or counteraction, making it possible to reduce the pattern noise produced by the lug grooves. Note that the lug grooves made to differ in pitch in the tire circumferential direction of the protrusions 9 include all lug grooves of the plurality of rib-like land portions 23 defined in the tire width direction by the plurality of main grooves 22. However, in order to remarkably obtain the effect of reducing the pattern noise produced by the lug grooves, the pitch of the protrusions 9 in the tire circumferential direction is preferably made to differ from the pitch of the lug grooves on the outermost side in the tire width direction disposed closest to the protrusions 9.

Also, preferably, the pneumatic tire 1 according to the present embodiment has a designated vehicle inner/outer orientation when mounted on a vehicle, and the protrusions 9 are disposed on the tire side portion S on the vehicle outer side.

That is, in cases where the pneumatic tire 1 of the present embodiment is mounted on the vehicle 100 (refer to FIG. 3A and FIG. 3B), orientations with respect to the inner side and the outer side in the tire width direction of the vehicle 100 are designated. The orientation designations, while not explicitly illustrated in the drawings, for example, can be shown via indicators provided on the sidewall portions 4. Therefore, the side facing the inner side of the vehicle 100 when mounted on the vehicle 100 is the "vehicle inner side", and the side facing the outer side of the vehicle 100 is the "vehicle outer side". Note that the designations of the vehicle inner side and the vehicle outer side are not limited to cases when mounted on the vehicle 100. For example, in cases in which the pneumatic tire 1 is mounted on a rim, orientation of a rim 50 (refer to FIG. 3A and FIG. 3B) with respect to the inner side and the outer side of the vehicle 100 in the tire width direction is predetermined. Thus, in cases in which the pneumatic tire 1 is mounted on a rim, the orientation with respect to the vehicle inner side and the vehicle outer side in the tire width direction is designated.

The tire side portion S on the vehicle outer side appears on the outer side from the tire housing 100H when mounted to the vehicle 100, and thus provision of the protrusions 9 to the tire side portion S on this vehicle outer side makes it possible to push the air flow to the vehicle outer side and thus increase the downforce.

Other Arrangement Examples of Protrusions

FIGS. 30 to 33 are diagrams illustrating other arrangement examples of the protrusions 9.

Figure 30:
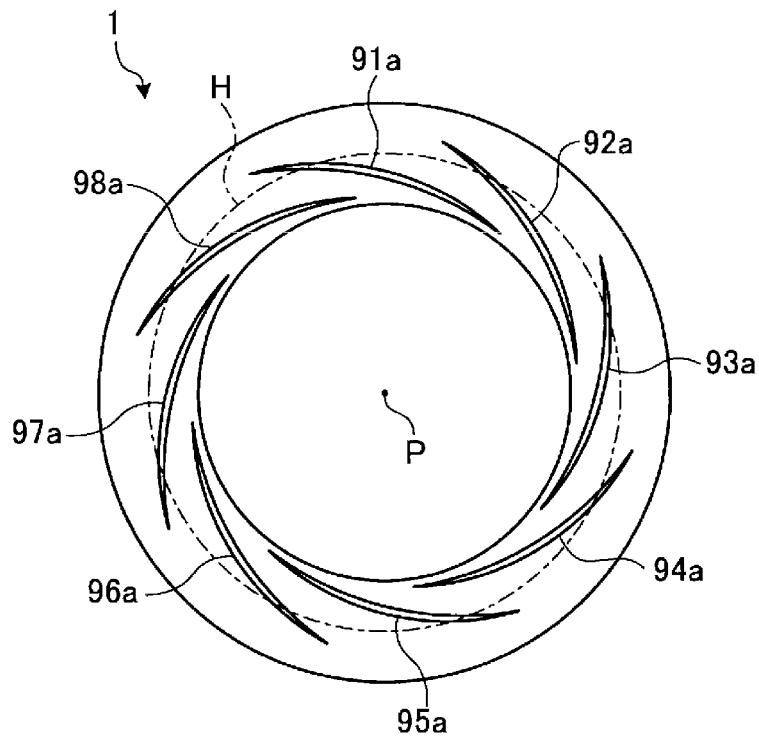
FIG. 30 is a diagram illustrating another arrangement example of the protrusions.

The pneumatic tire 1 illustrated in FIG. 30 includes a plurality of protrusions 91a, 92a, 93a, 94a, 95a, 96a, 97a, and 98a on the tire side portion S. In this example, the spaces between each of the plurality of protrusions 91a, 92a, 93a, 94a, 95a, 96a, 97a, and 98a are uniform, that is, equal. Then, in this example, the plurality of protrusions 91a, 92a, 93a, 94a, 95a, 96a, 97a, and 98a are disposed in the range SD that includes the maximum tire width position H.

The protrusion 91a is provided to the tire side portion S on the outer side of the vehicle 100 on which the tire is mounted. For the protrusion 91a, the relationship between both end portions and the center of rotation P of the pneumatic tire 1 is opposite that of the protrusion 91 illustrated in FIG. 3A. That is, the end portion in the clockwise direction of the protrusion 91a is disposed on the inner side in the tire radial direction of the end portion in the counterclockwise direction. The protrusion 91a, similar to the protrusion 91 illustrated in FIG. 3B, has an arc shaped as viewed from the outer side of the vehicle 100 in the direction along the rotation axis P of the pneumatic tire 1, and the recessed portion side of the arc faces the direction of the center of rotation P of the pneumatic tire 1. The other protrusions 92a, 93a, 94a, 95a, 96a, 97a, and 98a are the same as the protrusion 91a.

Figure 31:
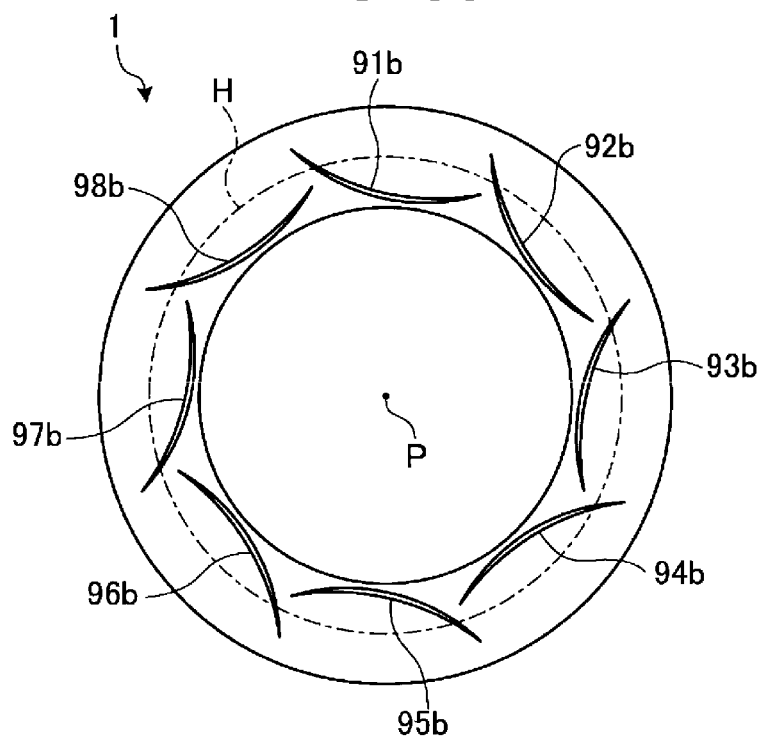
FIG. 31 is a diagram illustrating another arrangement example of the protrusions.

The pneumatic tire 1 illustrated in FIG. 31 includes a plurality of protrusions 91b, 92b, 93b, 94b, 95b, 96b, 97b, and 98b on the tire side portion S. In this example, the spaces between each of the plurality of protrusions 91b, 92b, 93b, 94b, 95b, 96b, 97b, and 98b are uniform, that is, equal. Then, in this example, the plurality of protrusions 91b, 92b, 93b, 94b, 95b, 96b, 97b, and 98b are disposed in the range SD that includes the maximum tire width position H.

The protrusion 91b has an arc shaped as viewed from the outer side of the vehicle 100 in the direction along the rotation axis P of the pneumatic tire 1 and, opposite to the protrusion 91a illustrated in FIG. 30, the convex portion side of the arc faces the direction of the center of rotation P of the pneumatic tire 1. The other protrusions 92b, 93b, 94b, 95b, 96b, 97b, and 98b are the same as the protrusion 91b.

Figure 32:
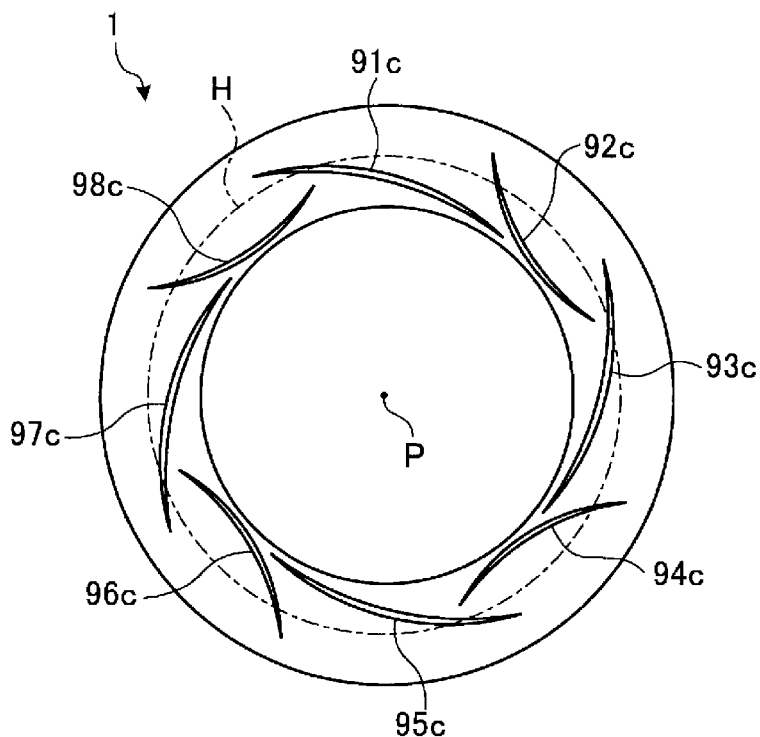
FIG. 32 is a diagram illustrating another arrangement example of the protrusions.

The pneumatic tire 1 illustrated in FIG. 32 includes a plurality of protrusions 91c, 92c, 93c, 94c, 95c, 96c, 97c, and 98c on the tire side portion S. In this example, the spaces between each of the plurality of protrusions 91c, 92c, 93c, 94c, 95c, 96c, 97c, and 98c are uniform, that is, equal. Then, in this example, the plurality of protrusions 91c, 92c, 93c, 94c, 95c, 96c, 97c, and 98c are disposed in the range SD that includes the maximum tire width position H.

The protrusions 91c, 92c, 93c, 94c, 95c, 96c, 97c, and 98c each have an arc shaped as viewed from the outer side of the vehicle 100 in the direction along the rotation axis P of the pneumatic tire 1. Then, unlike the pneumatic tire 1 illustrated in FIG. 30, the protrusions 91c, 93c, 95c, and 97c in which the recessed portion side of the arc faces the direction of the center of rotation P of the pneumatic tire 1, and the protrusions 92c, 94c, 96c, and 98c in which the convex portion side of the arc faces the direction of the center of rotation P of the pneumatic tire are alternately disposed.

Figure 33:
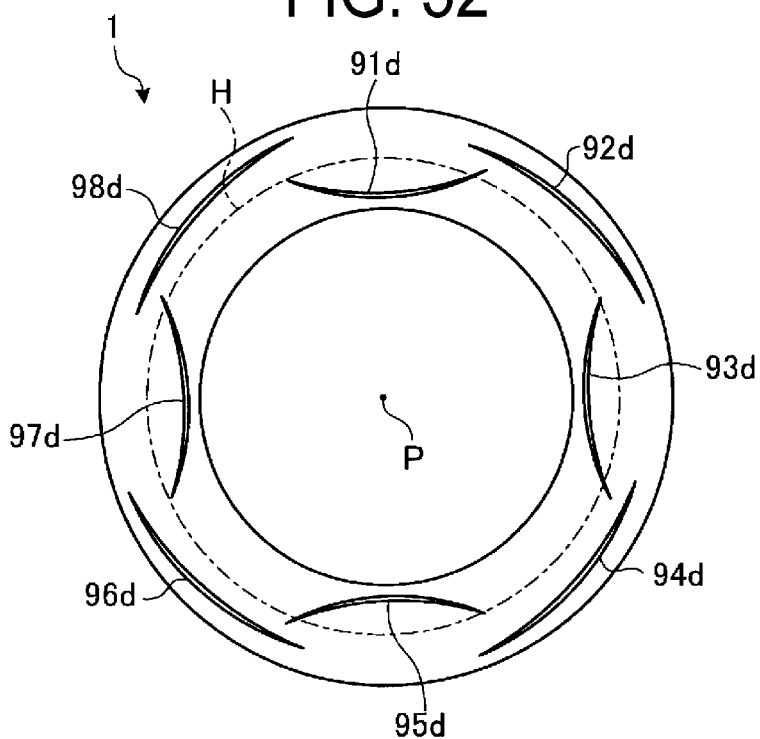
FIG. 33 is a diagram illustrating another arrangement example of the protrusions.

The pneumatic tire 1 illustrated in FIG. 33 includes a plurality of protrusions 91d, 92d, 93d, 94d, 95d, 96d, 97d, and 98d on the tire side portion S. In this example, the spaces between each of the plurality of protrusions 91d, 92d, 93d, 94d, 95d, 96d, 97d, and 98d are uniform, that is, equal. Then, in this example, the plurality of protrusions 91d, 92d, 93d, 94d, 95d, 96d, 97d, and 98d are disposed in the range SD that includes the maximum tire width position H. Then, unlike the pneumatic tire 1 illustrated in FIG. 30, the protrusions 91d, 93d, 95d, and 97d in which the convex portion side of the arc faces the direction of the center of rotation P of the pneumatic tire 1, and the protrusions 92d, 94d, 96d, and 98d in which the recessed portion side of the arc faces the direction of the center of rotation P of the pneumatic tire 1 are alternately disposed. The protrusions 91d, 93d, 95d, and 97d in which the convex portion side of the arc faces the direction of the center of rotation P of the pneumatic tire 1 are disposed so that the convex portion side of the arc is closer to the center of rotation P of the pneumatic tire 1 than the end portion of the arc. The protrusions 92d, 94d, 96d, and 98d in which the recessed portion side of the arc faces the direction of the center of rotation P of the pneumatic tire 1 are disposed so that the recessed portion side of the arc is farther away from the center of rotation P of the pneumatic tire 1 than the end portion of the arc.

As described above, the pneumatic tire 1 according to the present technology includes the plurality of protrusions 9 that are provided in the range SD including the maximum tire width position H in the tire side portion S, and extend in the direction that intersects the tire radial direction. The plurality of protrusions 9 are provided having a space therebetween in the tire circumferential direction, pass through the center of rotation P, extend in the tire radial direction and, when the first straight line S1 and the second straight line S2 each having different positions in the tire circumferential direction each traverse the protrusions 9, have a ratio of from 0.8 to 1.2, both inclusive, between the total mass per unit length for the protrusions 9 traversed by the first straight line 51 and the total mass per unit length for the protrusions 9 traversed by the second straight line S2. The ratio between the total width SW and the outer diameter OD fulfills the relationship SW/OD≤0.3.

Further, the pneumatic tire 1 according to the present technology includes the plurality of protrusions 9 that are provided in a range including the maximum tire width position H in the tire side portion S, and extend in the direction that intersects the radial direction. The plurality of protrusions 9 are provided having a space therebetween in the tire circumferential direction, pass through the center of rotation P, extend in the tire radial direction and, when the first straight line S1 and the second straight line S2 each having different positions in the tire circumferential direction each traverse the protrusions 9, have a ratio of from 0.8 to 1.2, both inclusive, between the total cross-sectional area along the first straight line S1 for the protrusions 9 traversed by the first straight line S1 and the total cross-sectional area along the second straight line S2 for the protrusions 9 traversed by the second straight line S2. The ratio between the total width SW and the outer diameter OD fulfills the relationship SW/OD≤0.3.

According to such a pneumatic tire 1 of the present embodiment, it is possible to increase downforce and reduce air resistance while maintaining good uniformity by the protrusions 9 disposed as described above.

Moreover, according to the pneumatic tire 1 of the present embodiment, the ratio of the total width SW to the outer diameter OD satisfies the relationship SW/OD≤0.3, resulting in a narrow total width and a large outer diameter compared to a typical pneumatic tire, making it possible to reduce rolling resistance and air resistance during travel. While there is the concern that, in a tire having a large outer diameter in particular, the low relative velocity of the air and the side portion (upper position of the tire side portion S when mounted on a vehicle) of the tire upper portion will cause an increase in air resistance without generating a turbulent air flow, according to the pneumatic tire 1 of the present embodiment, a turbulent air flow can be generated at the side portion of the tire upper portion and the effect of reducing air resistance can be maintained by satisfying the relationship of the ratio between the total width SW and the outer diameter OD described above and arranging the protrusions 9.

EXAMPLES

In these examples, tests were carried out for steering stability performance (dry road surfaces), air resistance reducing performance, uniformity, lift reducing performance (downforce improvement performance), ride comfort performance, and sound pressure level reducing performance for various types of pneumatic tire under different conditions. The results are shown in Table 3 and Table 4.

In the test for steering stability performance, a test tire with new components and a test tire at the wear threshold were mounted on a regular rim and inflated to a regular internal pressure. Then, the test tire was mounted on a passenger vehicle with motor assist, and the vehicle was driven on a test course having dry road surfaces. With the action of the downforce improving steering stability performance, evaluations were performed by expressing the feeling of the driver as index values with the results of the Conventional Example being defined as the reference (100). In this index evaluation, larger values indicate superior steering stability performance.

In the test for uniformity, a test tire was mounted on a regular rim and inflated to a regular internal pressure. Then, a lateral force variation (LFV) in the above test tire was measured in accordance with the tire uniformity specifications of JASO C607, "Test Procedures for Automobile Tire Uniformity". Evaluations were performed by expressing the measurement results as index values with the results of the Conventional Example being defined as the reference (100). In this index evaluation, a value of 98 or greater indicates that homogeneity was preserved and uniformity was maintained, and larger values indicate favorable homogeneity and superior uniformity.

In the tests for lift reducing performance and air resistance reducing performance, a simulation was conducted using a vehicle model with the test tire mounted to the body model of a passenger vehicle with motor assist. In this simulation, a wind tunnel test was conducted, and the aerodynamic characteristics (lift reducing performance and air resistance reducing performance) were calculated using fluid analytical software by the lattice Boltzmann method based on the aerodynamic drag coefficient thereof. The evaluations were performed by expressing the measurement results as index values with the Conventional Example being defined as the reference (100). In these index evaluations, larger values indicate superior lift reducing performance and air resistance reducing performance.

In the test for ride comfort performance, a test tire was mounted on a test vehicle, driving was carried out at 50 km/h on a straight test course having unevenness with a gradient of 10 mm, and the riding comfort was evaluated by a feeling test by three panelists. Evaluation was carried out by expressing the average of three test results as index values with the results of the Conventional Example being defined as the reference (100). In this index evaluation, a value of 99 or greater indicates that ride comfort performance was maintained, and larger values indicate superior ride comfort performance.

In the test for sound pressure level reducing performance, a test tire was mounted on a test vehicle, and the sound pressure level of external noise (sound pressure level reducing performance) was measured when driving was conducted at a travel speed equivalent to 80 km/h. The evaluations were performed by expressing the measurement results as index values with the Conventional Example being defined as the reference (100). In this index evaluation, a value of 99 or greater indicates that sound pressure level reducing performance was maintained, and larger values indicate superior sound pressure level reducing performance.

In Table 3, the pneumatic tire of the Conventional Example had the tire size described in Table 3, and did not include the protrusions. Further, the pneumatic tires of Comparative Examples 1 to 3 had the tire sizes described Table 3, the triangular cross-sectional shape in the lateral direction illustrated in FIG. 11, and a plurality of protrusions that passed through the maximum tire width position and extended in a direction intersecting the tire radial direction. However, the respective mass ratios of the protrusions deviated from the specified range.

Figure 11:
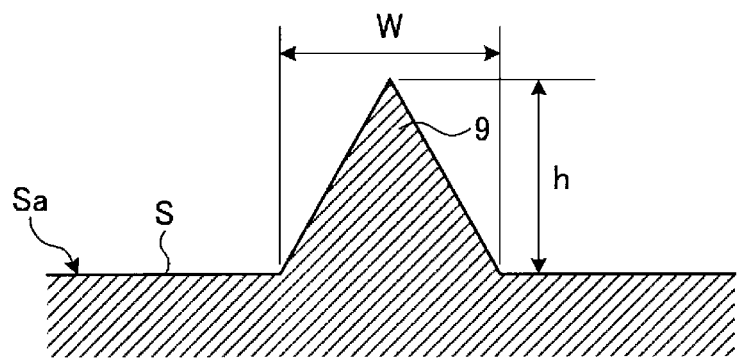
FIG. 11 is a cross-sectional view in the lateral direction of a protrusion.
Figure 12:
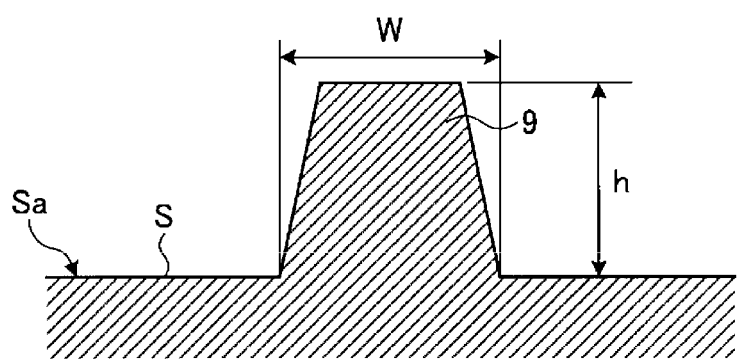
FIG. 12 is a cross-sectional view in the lateral direction of a protrusion.
Figure 13:
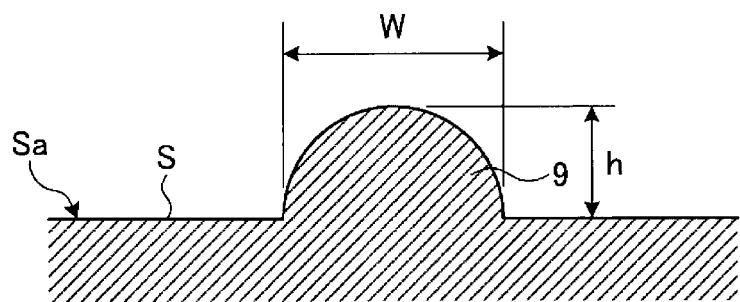
FIG. 13 is a cross-sectional view in the lateral direction of a protrusion.

On the other hand, in Table 3, the pneumatic tires of Examples 1 to 13 had the tire sizes of the specified range described in Table 3, a form such as illustrated in FIG. 9, the triangular cross-sectional shape in the lateral direction illustrated in FIG. 11, and a plurality of protrusions that passed through the maximum tire width position and extended in a direction intersecting the tire radial direction. Further, the respective mass ratios of the protrusions satisfied specifications. Additionally, the pneumatic tires of Examples 1 to 13 satisfied specifications such as the protrusion overlap in the tire radial direction, the projection height of the protrusions in the extension direction, the width of the protrusions in the extension direction, the mass change of the protrusions per 1 degree in the tire circumferential direction, the presence/absence of grooves, the presence/absence of recessed portions, the protrusion spacing, and the arrangement when mounted on a vehicle.

Further, in Table 4, the pneumatic tire of the Conventional Example had the tire size described in Table 4, and did not include the protrusions. Further, the pneumatic tires of Comparative Examples 4 to 6 had the tire sizes described Table 4, the triangular cross-sectional shape in the lateral direction illustrated in FIG. 11, and a plurality of protrusions that passed through the maximum tire width position and extended in a direction intersecting the tire radial direction. However, the respective cross-sectional area ratios of the protrusions deviated from the specified range.

On the other hand, in Table 4, the pneumatic tires of Examples 14 to 26 had the tire sizes of the specified range described in Table 4, a form such as illustrated in FIG. 9, the triangular cross-sectional shape in the lateral direction illustrated in FIG. 11, and a plurality of protrusions that passed through the maximum tire width position and extended in a direction intersecting the tire radial direction. Further, the respective cross-sectional area ratios of the protrusions satisfied specifications. Additionally, the pneumatic tires of Examples 14 to 26 satisfied specifications such as the protrusion overlap in the tire radial direction, the projection height of the protrusions in the extension direction, the width of the protrusions in the extension direction, the mass change of the protrusions per 1 degree in the tire circumferential direction, the presence/absence of grooves, the presence/absence of recessed portions, the protrusion spacing, and the arrangement when mounted on a vehicle.

Then, as indicated by the test results in Table 3 and Table 4, the pneumatic tires of each of the Examples were found to maintain or show improvements in steering stability performance, air resistance reducing performance, uniformity, lift reducing performance, ride comfort performance, and sound pressure level reducing performance.

TABLE 3

|  | Conventional Example | Comparative Example 1 | Comparative Example 2 | Comparative Example 3 |
| --- | --- | --- | --- | --- |
| Nominal width (total width) SW | 155 | 195 | 155 | 155 |
| Aspect ratio | 55 | 65 | 55 | 55 |
| Inner diameter | 20 | 15 | 20 | 20 |
| Outer diameter OD | 645 | 630 | 645 | 645 |
| SW/OD | 0.24 | 0.31 | 0.24 | 0.24 |
| Presence of protrusions | No | Yes | Yes | Yes |
| Protrusion position | — | Passes through maximum width | Passes through maximum width | Passes through maximum width |

TABLE 3-continued

|  |  |  |  |  |
|---|---|---|---|---|
| Overlapping of protrusions in tire radial direction | — | No | No | No |
| Height of protrusions in extension direction | — | Same | Same | Same |
| Width of protrusions in extension direction | — | Same | Same | Same |
| Mass ratio | — | Not alike | 0.7 | 1.3 |
| Mass change per 1 degree in tire circumferential direction of protrusions (g) | — | 0.4 | 0.4 | 0.4 |
| Presence of groove |  | No | No | No |
| Recessed portion | — | No | No | No |
| Space between protrusions | — | Uniform | Uniform | Uniform |
| Arrangement when mounted to vehicle | — | Vehicle outer side | Vehicle outer side | Vehicle outer side |
| Steering stability performance | 100 | 101 | 103 | 103 |
| Air resistance reducing performance | 100 | 98 | 100 | 100 |
| Uniformity | 100 | 97 | 97 | 97 |
| Lift reduction performance | 100 | 101 | 103 | 103 |
| Ride comfort performance | 100 | 99 | 99 | 99 |
| Sound pressure level reducing performance | 100 | 99 | 99 | 99 |

|  | Example 1 | Example 2 | Example 3 | Example 4 |
|---|---|---|---|---|
| Nominal width (total width) SW | 155 | 155 | 155 | 155 |
| Aspect ratio | 55 | 55 | 55 | 55 |
| Inner diameter | 20 | 20 | 20 | 20 |
| Outer diameter OD | 645 | 645 | 645 | 645 |
| SW/OD | 0.24 | 0.24 | 0.24 | 0.24 |
| Presence of protrusions | Yes | Yes | Yes | Yes |
| Protrusion position | Passes through maximum width | Passes through maximum width | Passes through maximum width | Passes through maximum width |
| Overlapping of protrusions in tire radial direction | No | Yes | Yes | Yes |
| Height of protrusions in extension direction | Same | Low leading edge portion | Low leading edge portion | Low leading edge portion |
| Width of protrusions in extension direction | Same | Same | Same | Same |
| Mass ratio | 0.8 | 0.8 | 1.2 | 1.0 |
| Mass change per 1 degree in tire circumferential direction of protrusions (g) | 0.4 | 0.3 | 0.3 | 0.3 |
| Presence of groove | No | No | No | No |
| Recessed portion | No | No | No | No |
| Space between protrusions | Uniform | Uniform | Uniform | Uniform |
| Arrangement when mounted to vehicle | Vehicle outer side | Vehicle outer side | Vehicle outer side | Vehicle outer side |
| Steering stability performance | 103 | 103 | 103 | 103 |
| Air resistance reducing performance | 100 | 100 | 100 | 100 |
| Uniformity | 98 | 98 | 98 | 99 |
| Lift reduction performance | 103 | 103 | 103 | 103 |
| Ride comfort performance | 99 | 99 | 99 | 99 |
| Sound pressure level reducing performance | 99 | 99 | 99 | 99 |

|  | Example 5 | Example 6 | Example 7 | Example 8 | Example 9 |
|---|---|---|---|---|---|
| Nominal width (total width) SW | 155 | 155 | 155 | 155 | 155 |
| Aspect ratio | 55 | 55 | 55 | 55 | 55 |
| Inner diameter | 20 | 20 | 20 | 20 | 20 |
| Outer diameter OD | 645 | 645 | 645 | 645 | 645 |
| SW/OD | 0.24 | 0.24 | 0.24 | 0.24 | 0.24 |
| Presence of protrusions | Yes | Yes | Yes | Yes | Yes |
| Protrusion position | Passes through maximum width | Passes through maximum width | Passes through maximum width | Passes through maximum width | Passes through maximum width |
| Overlapping of protrusions in tire radial direction | Yes | Yes | Yes | Yes | Yes |
| Height of protrusions in extension direction | Same | Low leading edge portion | Low leading edge portion | Low leading edge portion | Low leading edge portion |
| Width of protrusions in extension direction | Narrow leading edge portion | Narrow leading edge portion | Narrow leading edge portion | Narrow leading edge portion | Narrow leading edge portion |
| Mass ratio | 1.0 | 1.0 | 1.0 | 1.0 | 1.0 |
| Mass change per 1 degree in tire circumferential direction of protrusions (g) | 0.3 | 0.3 | 0.2 | 0.2 | 0.2 |
| Presence of groove | No | No | No | Yes | No |
| Recessed portion | No | No | No | No | Yes |

TABLE 3-continued

|  |  |  |  |  |  |
|---|---|---|---|---|---|
| Space between protrusions | Uniform | Uniform | Uniform | Uniform | Uniform |
| Arrangement when mounted to vehicle | Vehicle outer side | Vehicle outer side | Vehicle outer side | Vehicle outer side | Vehicle outer side |
| Steering stability performance | 103 | 103 | 103 | 103 | 103 |
| Air resistance reducing performance | 100 | 100 | 100 | 100 | 100 |
| Uniformity | 99 | 99 | 100 | 100 | 100 |
| Lift reduction performance | 103 | 103 | 103 | 103 | 103 |
| Ride comfort performance | 99 | 99 | 99 | 99.5 | 99.5 |
| Sound pressure level reducing performance | 99 | 99 | 99 | 99 | 99 |

|  | Example 10 | Example 11 | Example 12 | Example 13 |
|---|---|---|---|---|
| Nominal width (total width) SW | 155 | 155 | 155 | 155 |
| Aspect ratio | 55 | 55 | 55 | 55 |
| Inner diameter | 20 | 20 | 20 | 20 |
| Outer diameter OD | 645 | 645 | 645 | 645 |
| SW/OD | 0.24 | 0.24 | 0.24 | 0.24 |
| Presence of protrusions | Yes | Yes | Yes | Yes |
| Protrusion position | Passes through maximum width | Passes through maximum width | Passes through maximum width | Passes through maximum width |
| Overlapping of protrusions in tire radial direction | Yes | Yes | Yes | Yes |
| Height of protrusions in extension direction | Low leading edge portion | Low leading edge portion | Low leading edge portion | Low leading edge portion |
| Width of protrusions in extension direction | Narrow leading edge portion | Narrow leading edge portion | Narrow leading edge portion | Narrow leading edge portion |
| Mass ratio | 1.0 | 1.0 | 1.0 | 1.0 |
| Mass change per 1 degree in tire circumferential direction of protrusions (g) | 0.2 | 0.2 | 0.2 | 0.2 |
| Presence of groove | Yes | Yes | Yes | Yes |
| Recessed portion | Yes | Yes | Yes | Yes |
| Space between protrusions | Uniform | Not uniform | Not uniform | Not uniform |
| Arrangement when mounted to vehicle | Vehicle outer side | Vehicle outer side | Vehicle inner side | Vehicle outer side Vehicle inner side |
| Steering stability performance | 103 | 103 | 103 | 103 |
| Air resistance reducing performance | 100 | 100 | 100 | 100 |
| Uniformity | 100 | 100 | 100 | 100 |
| Lift reduction performance | 103 | 103 | 103 | 103 |
| Ride comfort performance | 100 | 100 | 100 | 100 |
| Sound pressure level reducing performance | 99 | 100 | 100 | 100 |

TABLE 4

|  | Conventional Example | Comparative Example 4 | Comparative Example 5 | Comparative Example 6 |
|---|---|---|---|---|
| Nominal width (total width) SW | 155 | 195 | 155 | 155 |
| Aspect ratio | 55 | 65 | 55 | 55 |
| Inner diameter | 20 | 15 | 20 | 20 |
| Outer diameter OD | 645 | 630 | 645 | 645 |
| SW/OD | 0.24 | 0.31 | 0.24 | 0.24 |
| Presence of protrusions | No | Yes | Yes | Yes |
| Protrusion position | — | Passes through maximum width | Passes through maximum width | Passes through maximum width |
| Overlapping of protrusions in tire radial direction | — | No | No | No |
| Height of protrusions in extension direction | — | Same | Same | Same |
| Width of protrusions in extension direction | — | Same | Same | Same |
| Cross-sectional area ratio | — | Not alike | 0.7 | 1.3 |
| Mass change per 1 degree in tire circumferential direction of protrusions (g) | — | 0.4 | 0.4 | 0.4 |
| Presence of groove | — | No | No | No |
| Recessed portion | — | No | No | No |
| Space between protrusions | — | Uniform | Uniform | Uniform |
| Arrangement when mounted to vehicle | — | Vehicle outer side | Vehicle outer side | Vehicle outer side |
| Steering stability performance | 100 | 101 | 103 | 103 |
| Air resistance reducing performance | 100 | 98 | 100 | 100 |
| Uniformity | 100 | 97 | 97 | 97 |

TABLE 4-continued

|  | | | | |
|---|---|---|---|---|
| Lift reduction performance | 100 | 101 | 103 | 103 |
| Ride comfort performance | 100 | 99 | 99 | 99 |
| Sound pressure level reducing performance | 100 | 99 | 99 | 99 |

|  | Example 14 | Example 15 | Example 16 | Example 17 |
|---|---|---|---|---|
| Nominal width (total width) SW | 155 | 155 | 155 | 155 |
| Aspect ratio | 55 | 55 | 55 | 55 |
| Inner diameter | 20 | 20 | 20 | 20 |
| Outer diameter OD | 645 | 645 | 645 | 645 |
| SW/OD | 0.24 | 0.24 | 0.24 | 0.24 |
| Presence of protrusions | Yes | Yes | Yes | Yes |
| Protrusion position | Passes through maximum width | Passes through maximum width | Passes through maximum width | Passes through maximum width |
| Overlapping of protrusions in tire radial direction | No | Yes | Yes | Yes |
| Height of protrusions in extension direction | Same | Low leading edge portion | Low leading edge portion | Low leading edge portion |
| Width of protrusions in extension direction | Same | Same | Same | Same |
| Cross-sectional area ratio | 0.8 | 0.8 | 1.2 | 1.0 |
| Mass change per 1 degree in tire circumferential direction of protrusions (g) | 0.4 | 0.3 | 0.3 | 0.3 |
| Presence of groove | No | No | No | No |
| Recessed portion | No | No | No | No |
| Space between protrusions | Uniform | Uniform | Uniform | Uniform |
| Arrangement when mounted to vehicle | Vehicle outer side | Vehicle outer side | Vehicle outer side | Vehicle outer side |
| Steering stability performance | 103 | 103 | 103 | 103 |
| Air resistance reducing performance | 100 | 100 | 100 | 100 |
| Uniformity | 98 | 98 | 98 | 99 |
| Lift reduction performance | 103 | 103 | 103 | 103 |
| Ride comfort performance | 99 | 99 | 99 | 99 |
| Sound pressure level reducing performance | 99 | 99 | 99 | 99 |

|  | Example 18 | Example 19 | Example 20 | Example 21 | Example 22 |
|---|---|---|---|---|---|
| Nominal width (total width) SW | 155 | 155 | 155 | 155 | 155 |
| Aspect ratio | 55 | 55 | 55 | 55 | 55 |
| Inner diameter | 20 | 20 | 20 | 20 | 20 |
| Outer diameter OD | 645 | 645 | 645 | 645 | 645 |
| SW/OD | 0.24 | 0.24 | 0.24 | 0.24 | 0.24 |
| Presence of protrusions | Yes | Yes | Yes | Yes | Yes |
| Protrusion position | Passes through maximum width | Passes through maximum width | Passes through maximum width | Passes through maximum width | Passes through maximum width |
| Overlapping of protrusions in tire radial direction | Yes | Yes | Yes | Yes | Yes |
| Height of protrusions in extension direction | Same | Low leading edge portion | Low leading edge portion | Low leading edge portion | Low leading edge portion |
| Width of protrusions in extension direction | Narrow leading edge portion | Narrow leading edge portion | Narrow leading end portion | Narrow leading edge portion | Narrow leading end portion |
| Cross-sectional area ratio | 1.0 | 1.0 | 1.0 | 1.0 | 1.0 |
| Mass change per 1 degree in tire circumferential direction of protrusions (g) | 0.3 | 0.3 | 0.2 | 0.2 | 0.2 |
| Presence of groove | No | No | No | Yes | No |
| Recessed portion | No | No | No | No | Yes |
| Space between protrusions | Uniform | Uniform | Uniform | Uniform | Uniform |
| Arrangement when mounted to vehicle | Vehicle outer side | Vehicle outer side | Vehicle outer side | Vehicle outer side | Vehicle outer side |
| Steering stability performance | 103 | 103 | 103 | 103 | 103 |
| Air resistance reducing performance | 100 | 100 | 100 | 100 | 100 |
| Uniformity | 99 | 99 | 100 | 100 | 100 |
| Lift reduction performance | 103 | 103 | 103 | 103 | 103 |
| Ride comfort performance | 99 | 99 | 99 | 99.5 | 99.5 |
| Sound pressure level reducing performance | 99 | 99 | 99 | 99 | 99 |

|  | Example 23 | Example 24 | Example 25 | Example 26 |
|---|---|---|---|---|
| Nominal width (total width) SW | 155 | 155 | 155 | 155 |
| Aspect ratio | 55 | 55 | 55 | 55 |
| Inner diameter | 20 | 20 | 20 | 20 |
| Outer diameter OD | 645 | 645 | 645 | 645 |
| SW/OD | 0.24 | 0.24 | 0.24 | 0.24 |

TABLE 4-continued

| Presence of protrusions | Yes | Yes | Yes | Yes |
|---|---|---|---|---|
| Protrusion position | Passes through maximum width | Passes through maximum width | Passes through maximum width | Passes through maximum width |
| Overlapping of protrusions in tire radial direction | Yes | Yes | Yes | Yes |
| Height of protrusions in extension direction | Low leading edge portion | Low leading edge portion | Low leading edge portion | Low leading edge portion |
| Width of protrusions in extension direction | Narrow leading edge portion | Narrow leading edge portion | Narrow leading end portion | Narrow leading end portion |
| Cross-sectional area ratio | 1.0 | 1.0 | 1.0 | 1.0 |
| Mass change per 1 degree in tire circumferential direction of protrusions (g) | 0.2 | 0.2 | 0.2 | 0.2 |
| Presence of groove | Yes | Yes | Yes | Yes |
| Recessed portion | Yes | Yes | Yes | Yes |
| Space between protrusions | Uniform | Not uniform | Not uniform | Not uniform |
| Arrangement when mounted to vehicle | Vehicle outer side | Vehicle outer side | Vehicle inner side | Vehicle outer side Vehicle inner side |
| Steering stability performance | 103 | 103 | 103 | 103 |
| Air resistance reducing performance | 100 | 100 | 100 | 100 |
| Uniformity | 100 | 100 | 100 | 100 |
| Lift reduction performance | 103 | 103 | 103 | 103 |
| Ride comfort performance | 100 | 100 | 100 | 100 |
| Sound pressure level reducing performance | 99 | 100 | 100 | 100 |

The invention claimed is:

1. A pneumatic tire comprising:
a plurality of protrusions provided in a range including a maximum tire width position in a tire side portion, and extend in a direction that intersects a tire radial direction;
the plurality of protrusions being provided having a space therebetween in a tire circumferential direction, adjacent protrusions of the plurality of protrusions adjacent to each other in the tire circumferential direction overlapping in view of the tire radial direction, when a first straight line and a second straight line passing through a center of rotation, extending in the tire radial direction and each having different positions in the tire circumferential direction, each traverse the protrusions, a ratio of a total mass per unit length for the protrusions traversed by the first straight line to a total mass per unit length for the protrusions traversed by the second straight line is set to 0.8 to 1.2, both inclusive;
the first straight line traversing two or more of the adjacent protrusions, and the second straight line traversing one of the adjacent protrusions; and
a ratio between a total width SW and an outer diameter OD fulfilling a relationship SW/OD≤0.3;
wherein the protrusions have a height of a central portion that is greater than a height of both end portions.

2. The pneumatic tire according to claim 1, wherein an amount of fluctuation in the tire circumferential direction of a mass of the protrusions per 1 degree in the tire circumferential direction is 0.2 g/degree or less.

3. The pneumatic tire according to claim 1, wherein the protrusions have a width of a central portion that is greater than a width of both end portions.

4. The pneumatic tire according to claim 1, wherein the protrusions pass through a maximum tire width position.

5. The pneumatic tire according to claim 1, wherein at least one of the plurality of protrusions comprises a groove.

6. The pneumatic tire according to claim 5, wherein a depth of the groove is from 5% to 80%, both inclusive, of a height of a section where the groove of the protrusion is provided.

7. The pneumatic tire according to claim 1, wherein at least one of the plurality of protrusions comprises a recessed portion.

8. The pneumatic tire according to claim 1, wherein a vehicle inner/outer orientation when mounted on a vehicle is designated, and the protrusions are formed on the tire side portion on at least a vehicle outer side.

9. A pneumatic tire comprising:
a plurality of protrusions that are provided in a range including a maximum tire width position in a tire side portion, and extend in a direction that intersects a tire radial direction;
the plurality of protrusions being provided having a space therebetween in a tire circumferential direction, adjacent protrusions of the plurality of protrusions adjacent to each other in the tire circumferential direction overlapping in view of the tire radial direction, when a first straight line and a second straight line passing through a center of rotation, extending in the tire radial direction and each having different positions in the tire circumferential direction, each traverse the protrusions, a ratio of a total cross-sectional area along the first straight line for the protrusions traversed by the first straight line to a total cross-sectional area along the second straight line for the protrusions traversed by the second straight line is set to 0.8 to 1.2, both inclusive;
the first straight line traversing two or more of the adjacent protrusions, and the second straight line traversing one of the adjacent protrusions; and
a ratio between a total width SW and an outer diameter OD fulfilling a relationship SW/OD≤0.3;
wherein the protrusions have a height of a central portion that is greater than a height of both end portions.

10. The pneumatic tire according to claim 9, wherein the first straight line traverses two or more of the protrusions, and the second straight line traverses one of the protrusions.

11. The pneumatic tire according to claim 9, wherein an amount of fluctuation in the tire circumferential direction of a mass of the protrusions per 1 degree in the tire circumferential direction is 0.2 g/degree or less.

12. The pneumatic tire according to claim 9, wherein the protrusions have a width of a central portion that is greater than a width of both end portions.

13. The pneumatic tire according to claim 9, wherein the protrusions pass through a maximum tire width position.

14. The pneumatic tire according to claim 9, wherein at least one of the plurality of protrusions comprises a groove.

15. The pneumatic tire according to claim 14, wherein a depth of the groove is from 5% to 80%, both inclusive, of a height of a section where the groove of the protrusion is provided.

16. The pneumatic tire according to claim 9, wherein at least one of the plurality of protrusions comprises a recessed portion.

\* \* \* \* \*